United States Patent
Lee et al.

(10) Patent No.: US 10,015,725 B2
(45) Date of Patent: Jul. 3, 2018

(54) METHOD AND APPARATUS FOR TRANSMITTING UPLINK DATA IN WIRELESS COMMUNICATION SYSTEM

(71) Applicant: LG ELECTRONICS INC., Seoul (KR)

(72) Inventors: Eunjong Lee, Seoul (KR); Jaehoon Chung, Seoul (KR); Genebeck Hahn, Seoul (KR); Jinmin Kim, Seoul (KR); Kukheon Choi, Seoul (KR); Kwangseok Noh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/323,690

(22) PCT Filed: May 4, 2015

(86) PCT No.: PCT/KR2015/004471
§ 371 (c)(1),
(2) Date: Jan. 3, 2017

(87) PCT Pub. No.: WO2016/003065
PCT Pub. Date: Jan. 7, 2016

(65) Prior Publication Data
US 2017/0150424 A1    May 25, 2017

Related U.S. Application Data

(60) Provisional application No. 62/020,403, filed on Jul. 3, 2014.

(51) Int. Cl.
*H04W 48/12* (2009.01)
*H04W 72/04* (2009.01)
*H04W 74/00* (2009.01)

(52) U.S. Cl.
CPC ....... *H04W 48/12* (2013.01); *H04W 72/0413* (2013.01); *H04W 74/002* (2013.01)

(58) Field of Classification Search
None
See application file for complete search history.

(56) References Cited

U.S. PATENT DOCUMENTS

2011/0310811 A1* 12/2011 Yamada ............. H04W 52/146
370/329
2012/0157141 A1*  6/2012 Lim ...................... H04W 74/08
455/509

(Continued)

FOREIGN PATENT DOCUMENTS

WO    2011/136586    11/2011

OTHER PUBLICATIONS

Qualcomm Incorporated, "Remaining Details of UL Power Control for TDD eIMTA," 3GPP TSG RAN WG1 #76, R1-140437, Feb. 2014, 4 pages.

(Continued)

*Primary Examiner* — Bunjob Jaroenchonwanit
(74) *Attorney, Agent, or Firm* — Lee, Hong, Degerman, Kang & Waimey

(57) ABSTRACT

A method for transmitting uplink (UL) data requiring low latency in a wireless communication system is disclosed. The method performed by a user equipment (UE) includes receiving a first control message for informing a basic Contention-based PUSCH (Physical Uplink Shared Channel) Zone (CP zone) allocated to each subframe from an enhanced Node B (eNB), receiving a second control message for informing changes in a CP zone allocated to a specific subframe from the eNB, and transmitting UL data to the eNB through a CPRB (Contention PUSCH Resource Block) of the changed CP zone based on the received second control message. The first control message includes basic CP (Continued)

zone resource information indicating resource information of the basic CP zone, and the second control message includes changed CP zone resource information indicating resource information of the changed CP zone.

12 Claims, 20 Drawing Sheets

(56) References Cited

U.S. PATENT DOCUMENTS

| | | | | |
|---|---|---|---|---|
| 2012/0182977 | A1* | 7/2012 | Hooli | H04W 72/1278 |
| | | | | 370/336 |
| 2012/0213196 | A1* | 8/2012 | Chung | H04B 1/713 |
| | | | | 370/330 |
| 2013/0022012 | A1* | 1/2013 | Lee | H04W 52/0216 |
| | | | | 370/329 |
| 2013/0028219 | A1 | 1/2013 | Lee et al. | |
| 2013/0163532 | A1* | 6/2013 | Anderson | H04W 72/04 |
| | | | | 370/329 |
| 2014/0106768 | A1* | 4/2014 | Song | H04W 4/14 |
| | | | | 455/452.1 |
| 2015/0195854 | A1* | 7/2015 | Zhu | H04W 74/08 |
| | | | | 370/329 |
| 2015/0327245 | A1* | 11/2015 | Zhu | H04W 72/02 |
| | | | | 370/329 |

OTHER PUBLICATIONS

PCT International Application No. PCT/KR2015/004471, International Search Report dated Aug. 24, 2015, 2 pages.

\* cited by examiner

【Figure 1】
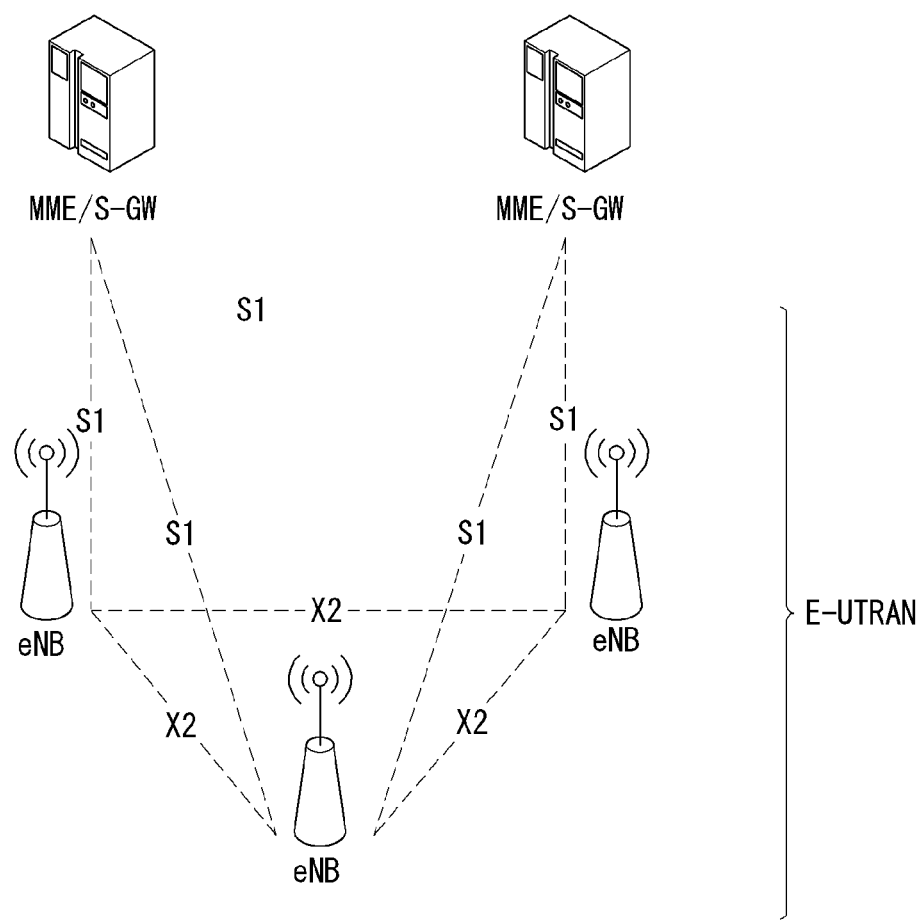

【Figure 2】
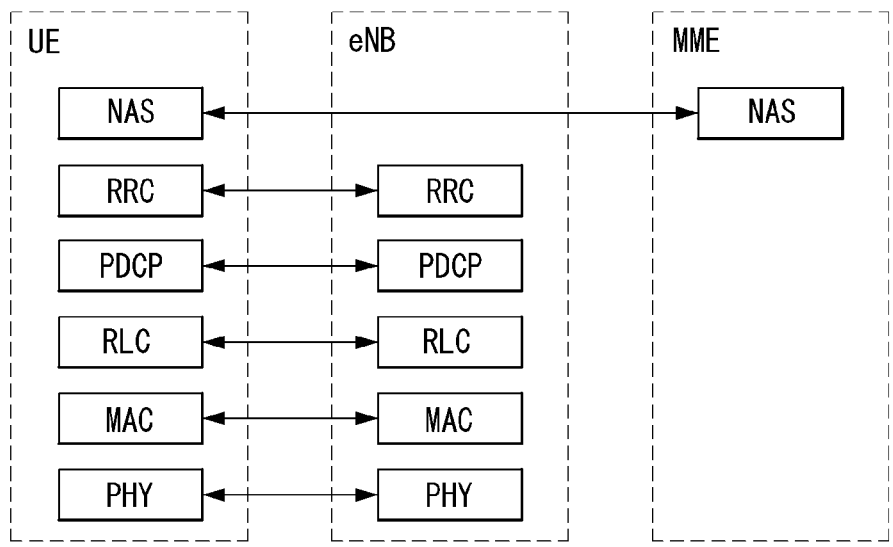
(a) CONTROL PLANE PROTOCOL STACK
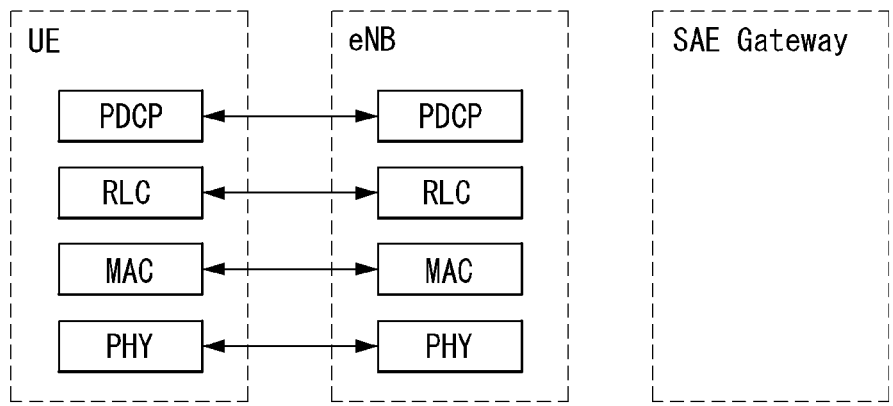
(b) USER PLANE PROTOCOL STACK

[Figure 3]
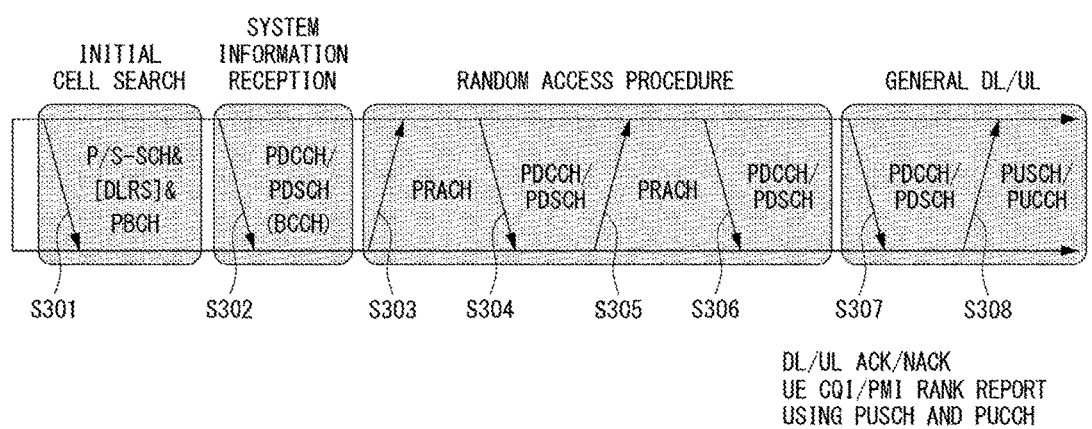

【Figure 4】
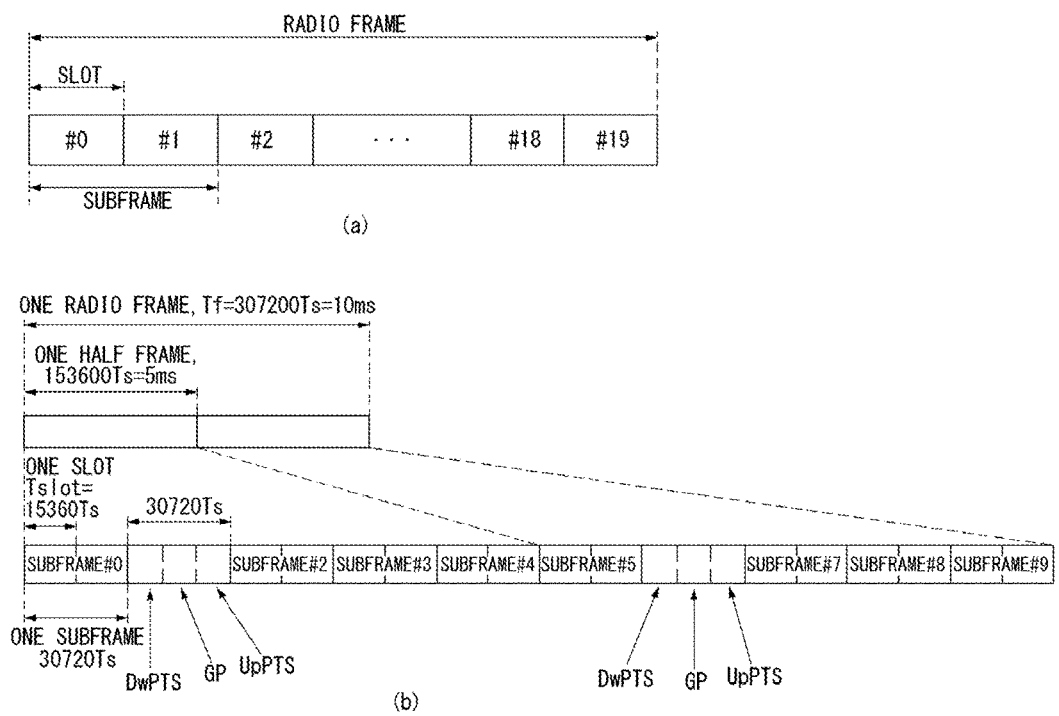

【Figure 5】
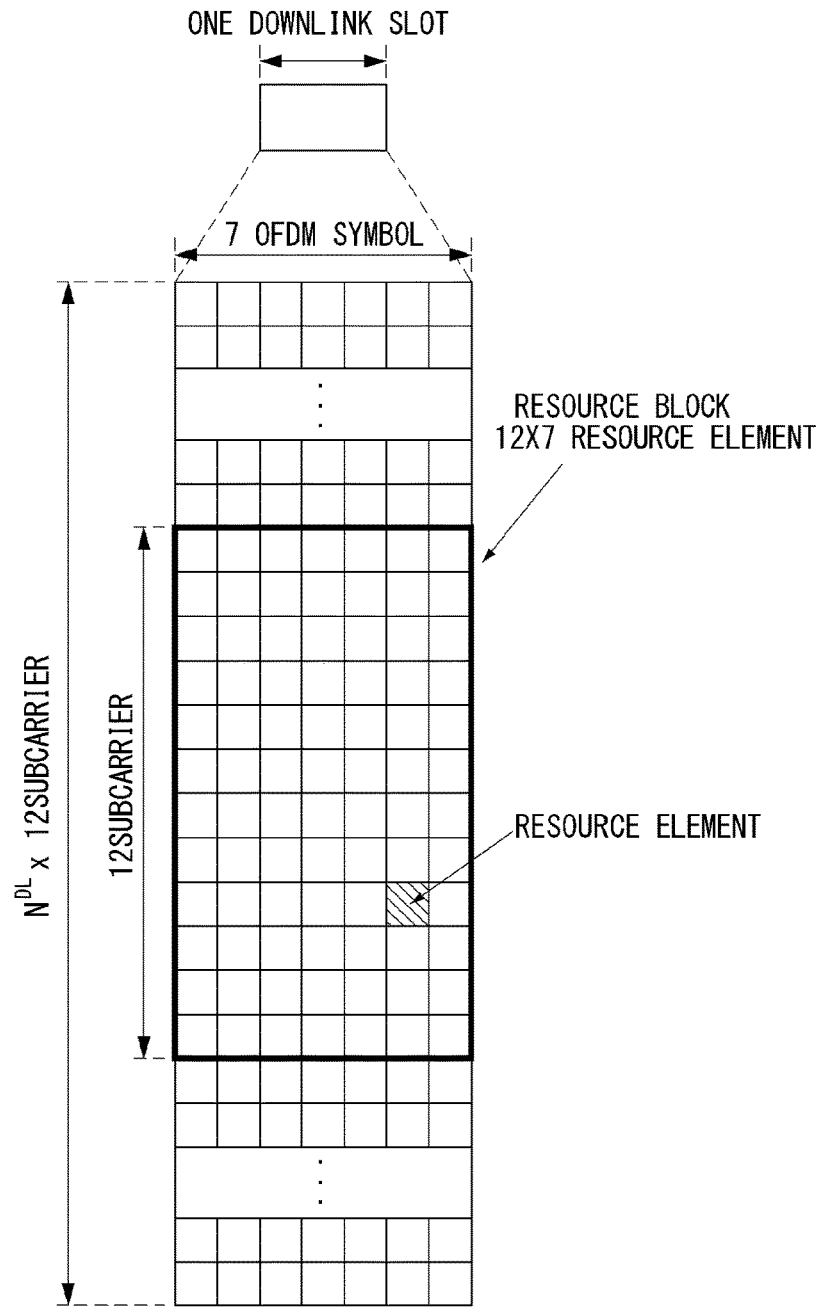

[Figure 6]
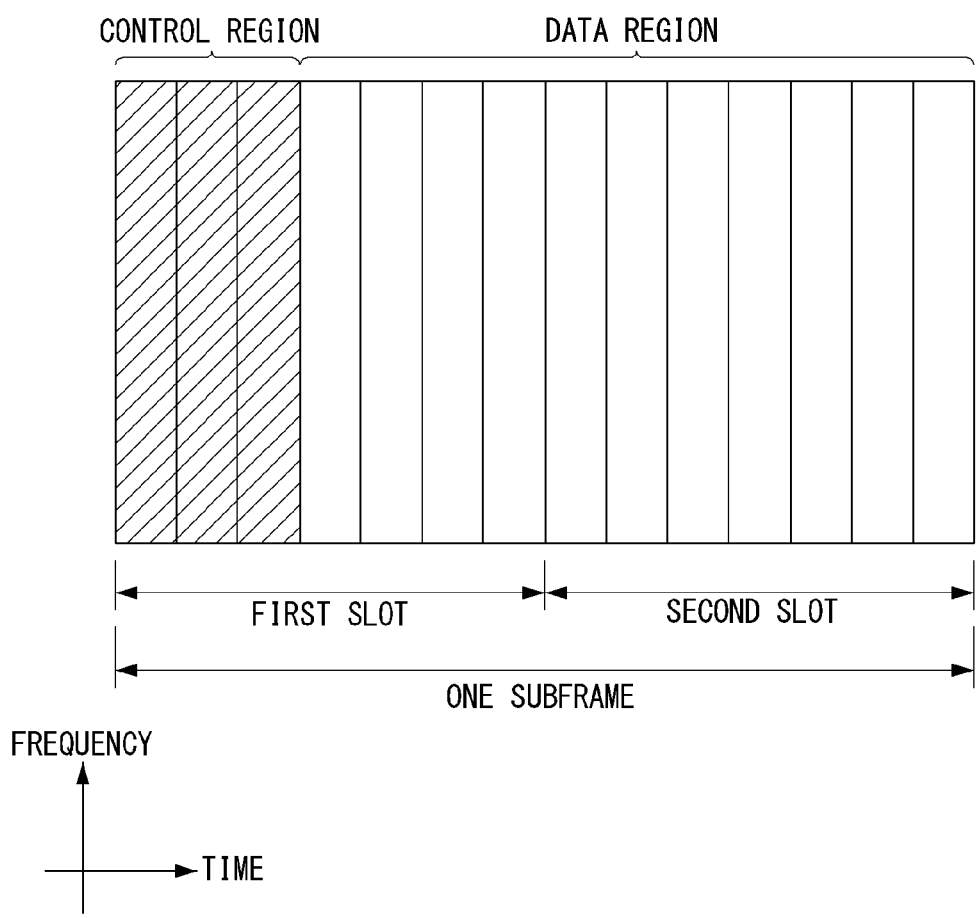

【Figure 7】
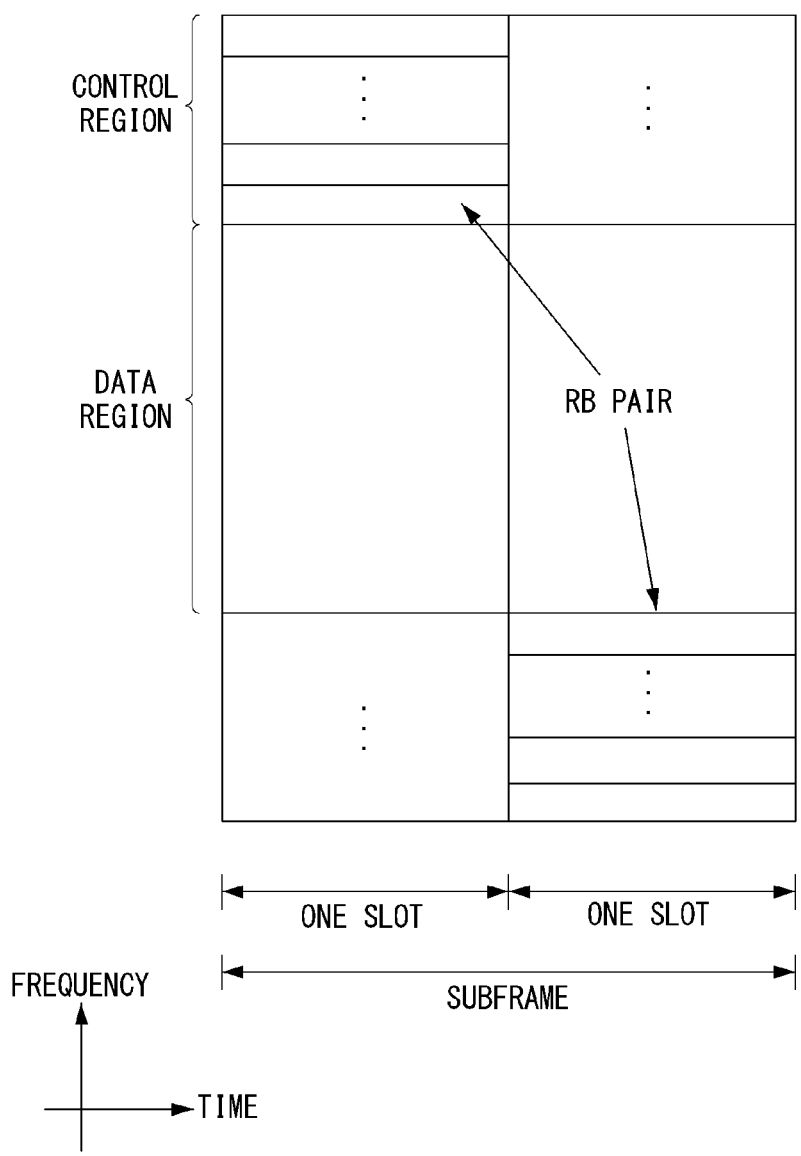

【Figure 8】
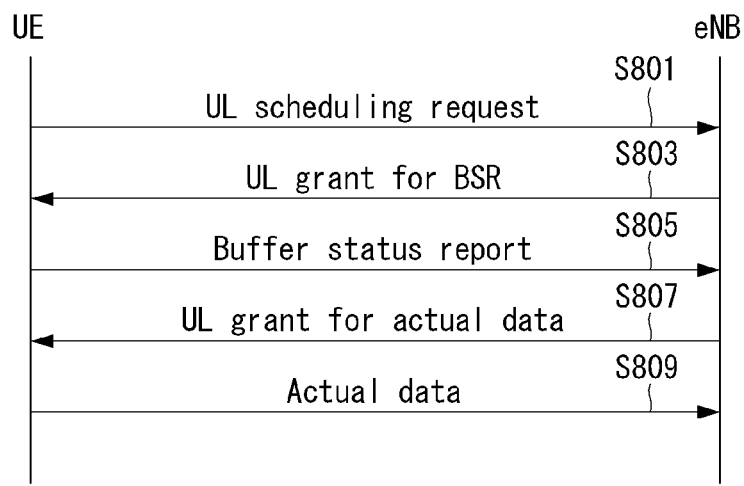
(a)
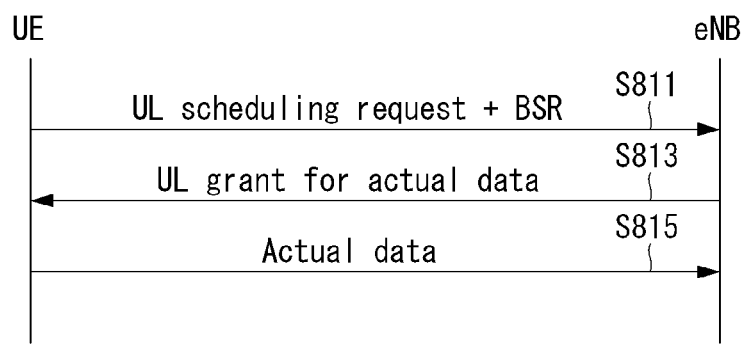
(b)

【Figure 9】
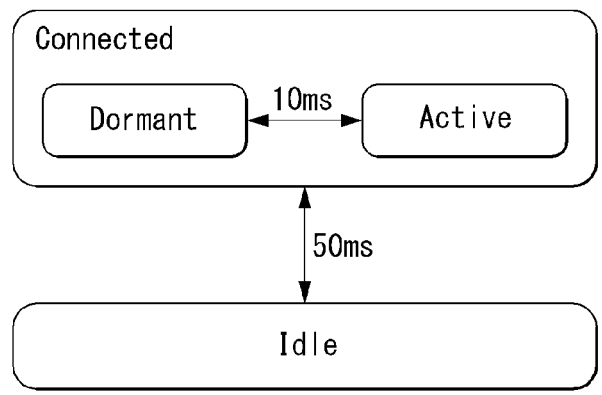
【Figure 10】
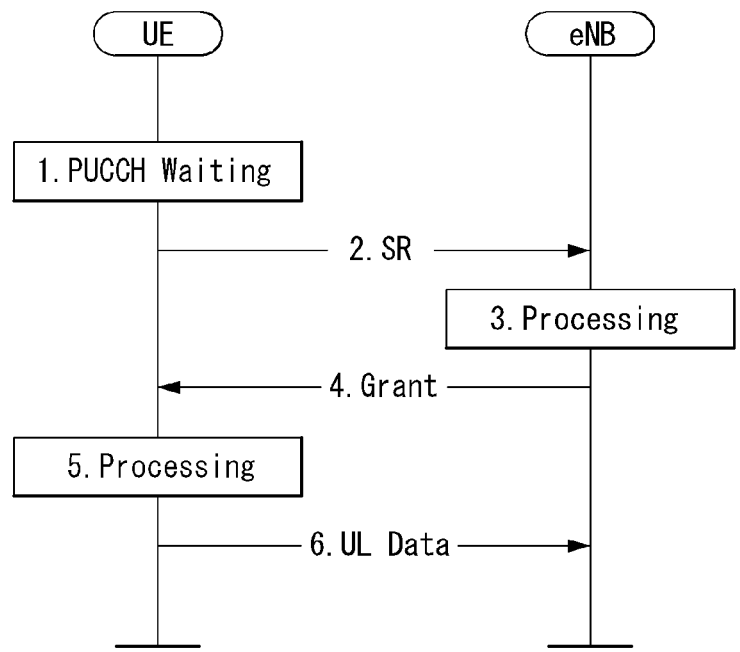

[Figure 11]
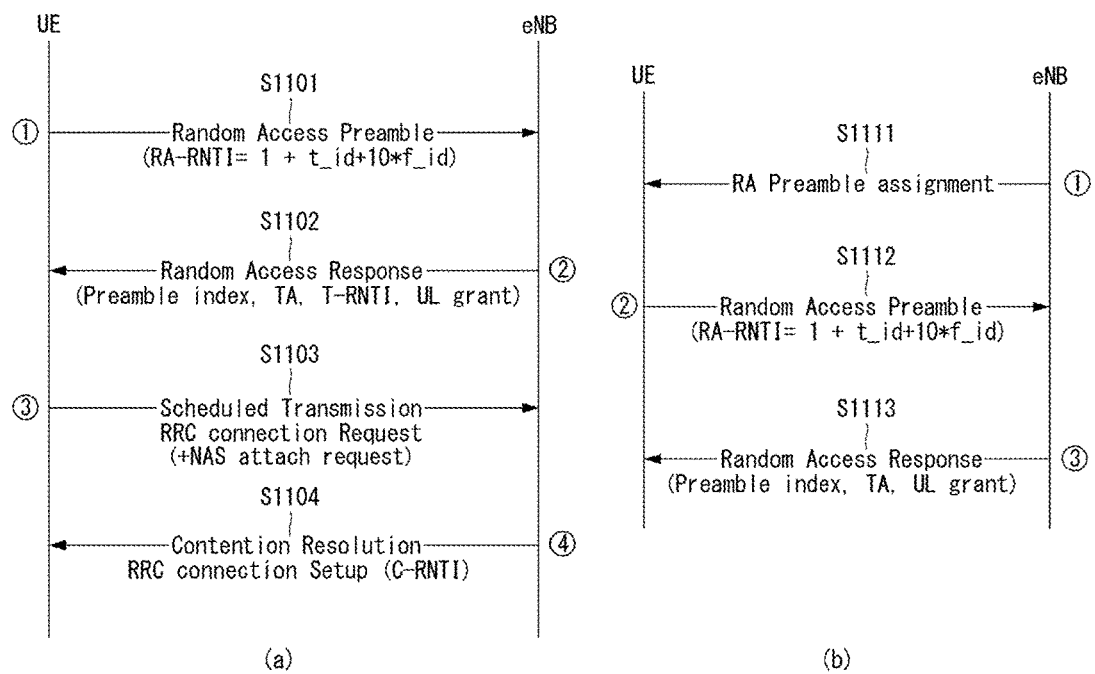

【Figure 12】
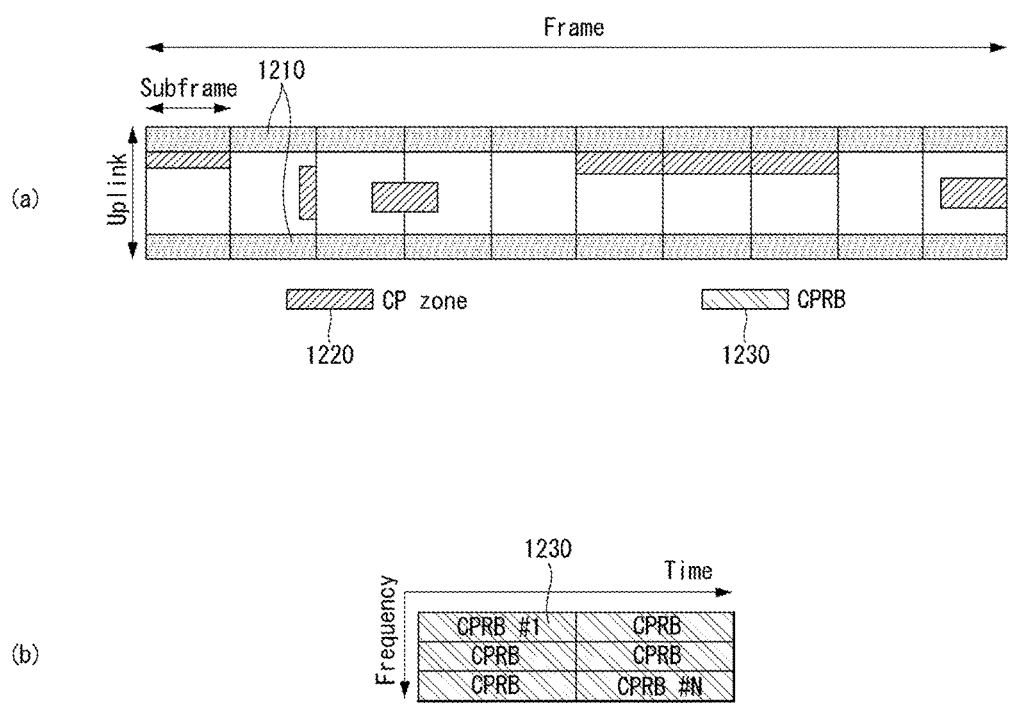

【Figure 13】
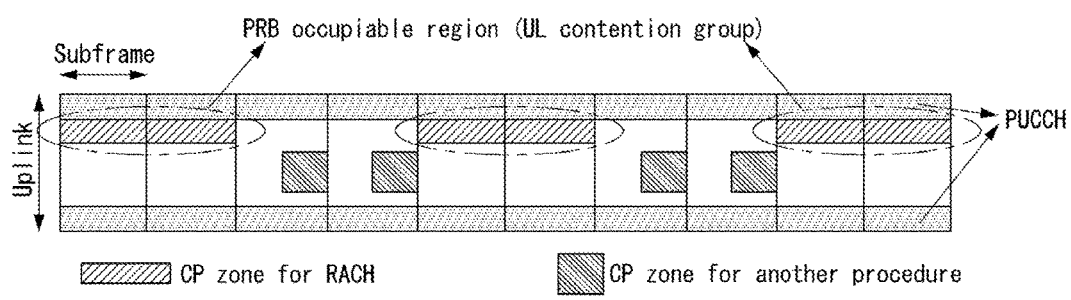
【Figure 14】
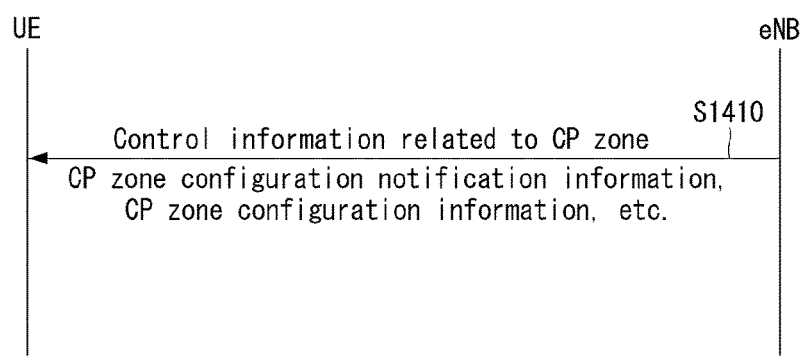

[Figure 15]
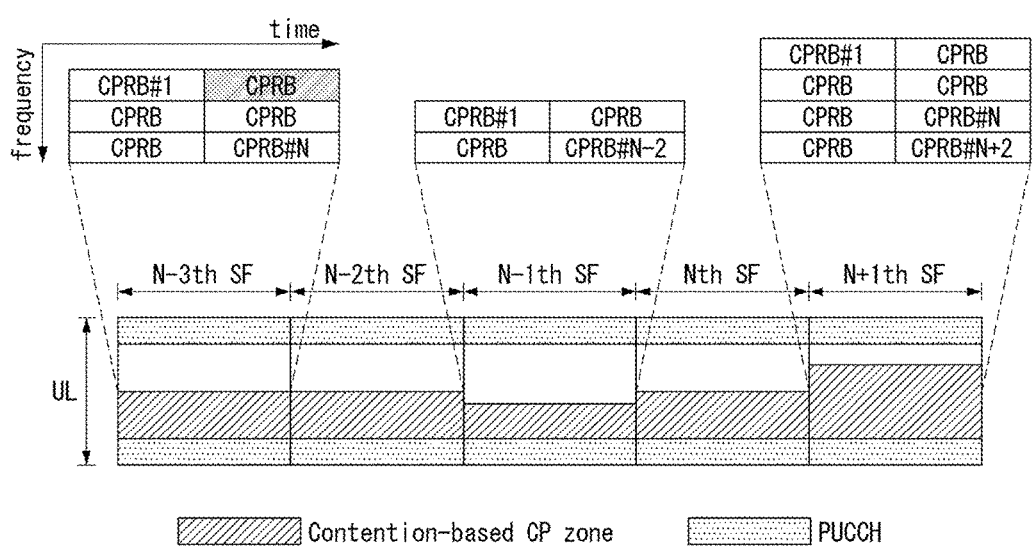

【Figure 16】
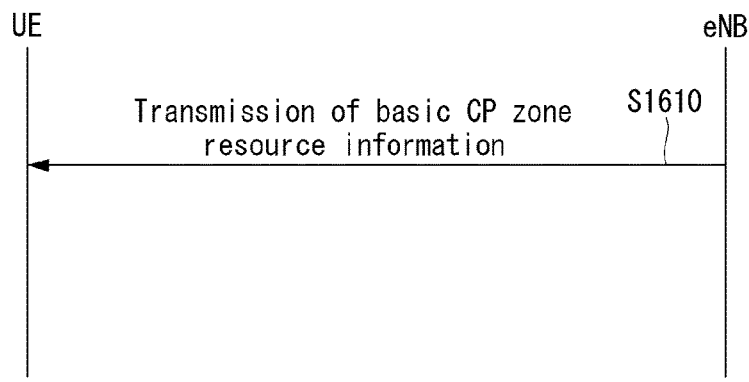

【Figure 17】
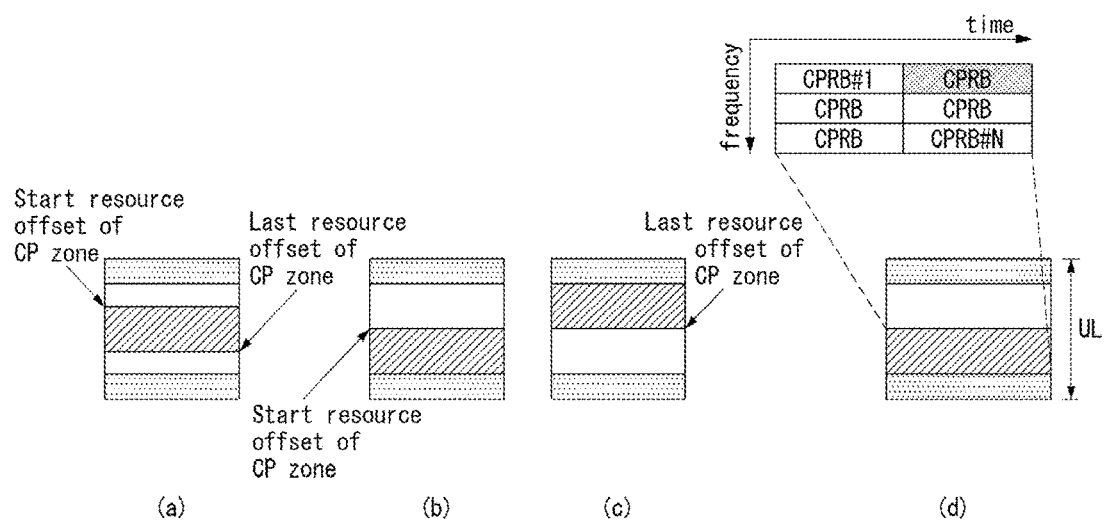

【Figure 18】
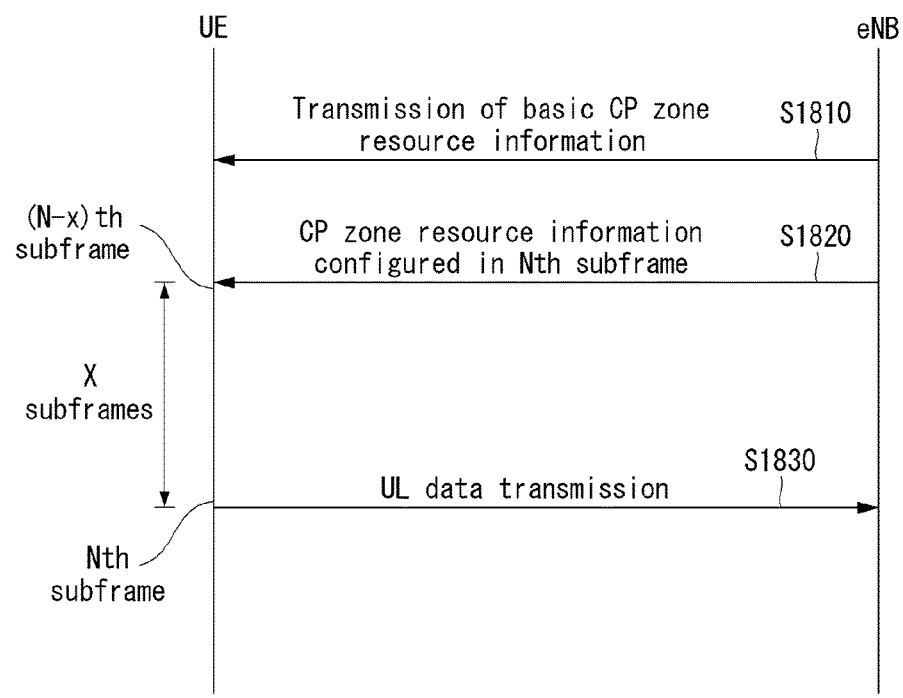

[Figure 19]
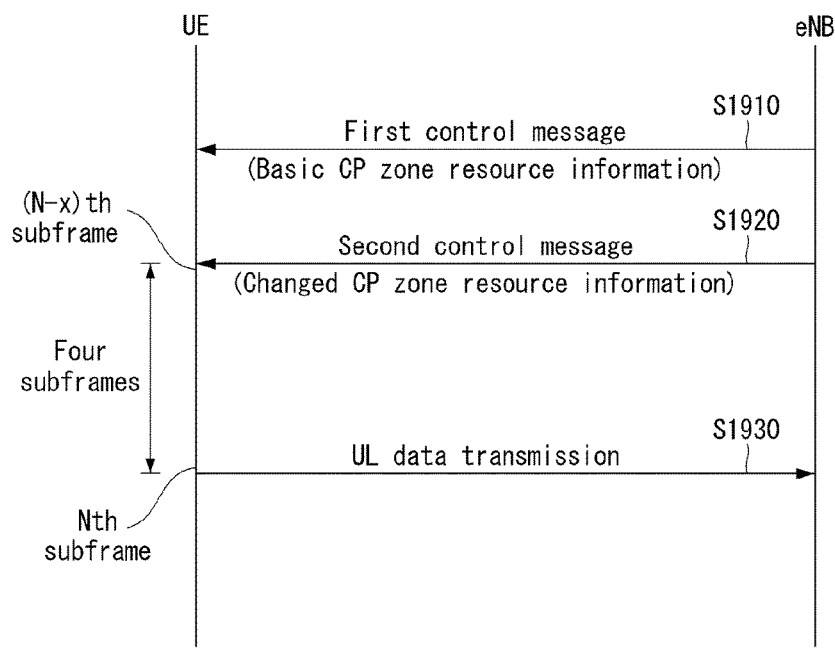

【Figure 20】
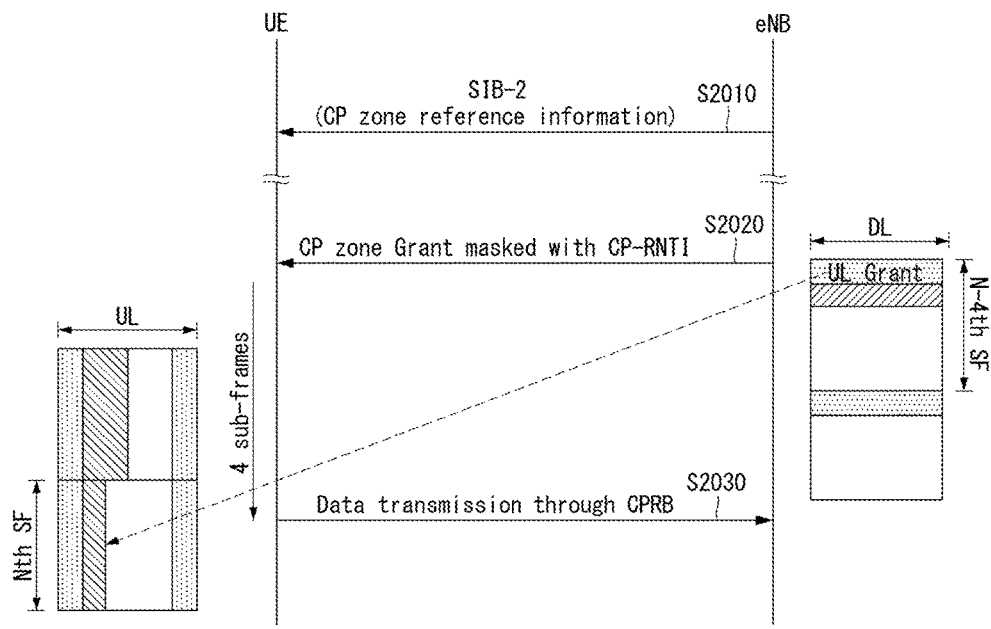

[Figure 21]
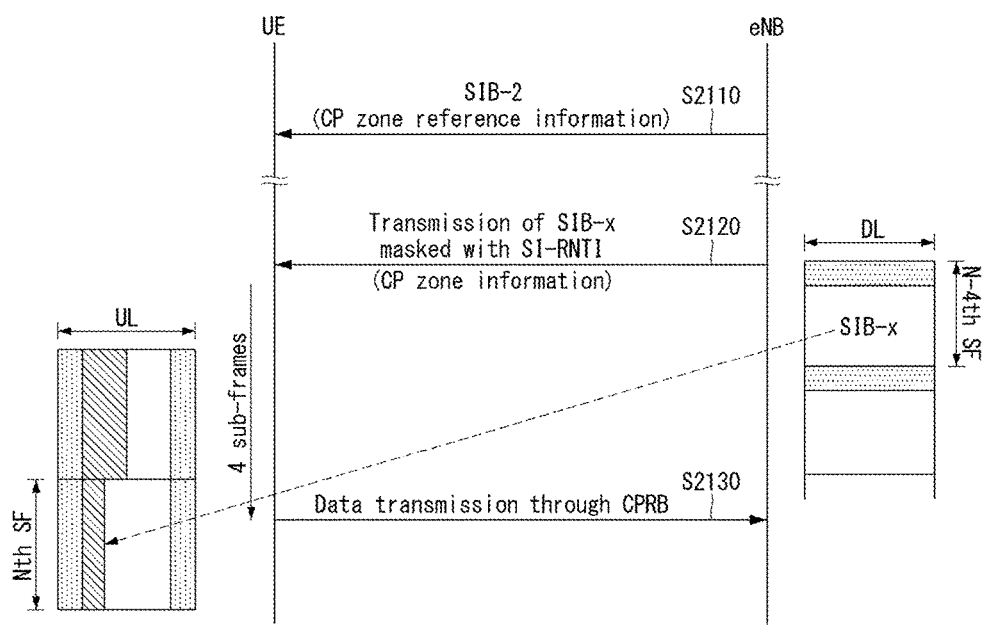

【Figure 22】
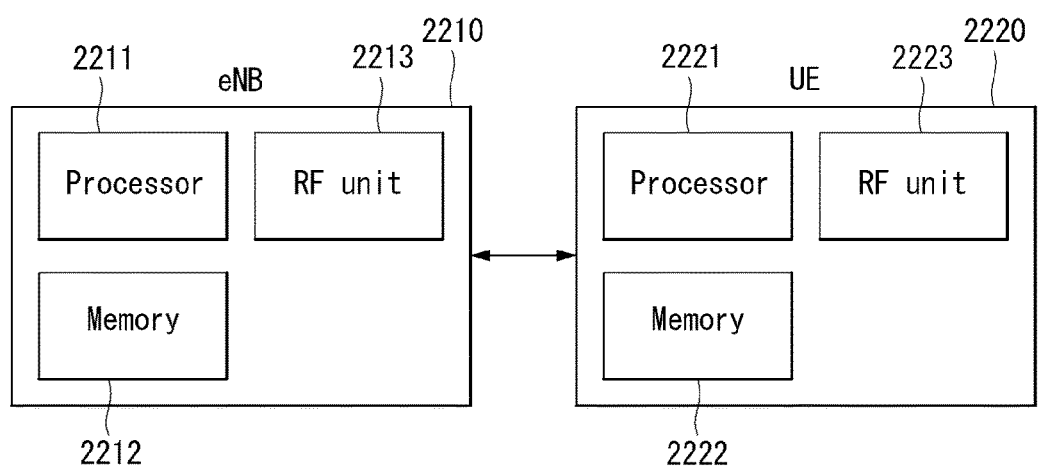

METHOD AND APPARATUS FOR TRANSMITTING UPLINK DATA IN WIRELESS COMMUNICATION SYSTEM

CROSS-REFERENCE TO RELATED APPLICATIONS

This application is the National Stage filing under 35 U.S.C. 371 of International Application No. PCT/KR2015/004471, filed on May 4, 2015, which claims the benefit of U.S. Provisional Application No. 62/020,403, filed on Jul. 3, 2014, the contents of which are all hereby incorporated by reference herein in their entirety.

TECHNICAL FIELD

The present disclosure relates to a wireless communication system, and more particularly, to a method for transmitting uplink data to an enhanced Node B through a user equipment and an apparatus supporting the same.

BACKGROUND ART

Mobile communication systems have been developed to provide voice services while guaranteeing user activity. Service coverage of mobile communication systems, however, has extended even to data services as well as voice services. Currently, an explosive increase in traffic has resulted in shortage of resource and user demand for high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, Non-Orthogonal Multiple Access (NOMA), supporting super wideband, and device networking, have been studied.

SUMMARY OF INVENTION

Technical Problem

The present disclosure provides a method for dynamically configuring a Contention-based PUSCH Zone (CP zone) by defining a basic CP zone and a basic Contention-based PUSCH Resource Block (CPRB) in a cell.

The present disclosure also provides a method for differentiating a CP zone from a scheduled UL resource region using start resource information and/or last resource information of the CP zone.

The present disclosure also provides a method for transmitting basic CP zone resource information and changed CP zone resource information through various manners.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying drawings.

Technical Solution

In one aspect, there is a method for transmitting uplink (UL) data requiring low latency in a wireless communication system, the method performed by a user equipment (UE) comprising receiving a first control message for informing a basic Contention-based PUSCH (Physical Uplink Shared Channel) Zone (CP zone) allocated to each subframe from an enhanced Node B (eNB), the first control message including basic CP zone resource information indicating resource information of the basic CP zone; receiving a second control message for informing changes in a CP zone allocated to a specific subframe from the eNB, the second control message including changed CP zone resource information indicating resource information of the changed CP zone; and transmitting UL data to the eNB through a CPRB (Contention PUSCH Resource Block) of the changed CP zone based on the received second control message.

The basic CP zone resource information includes at least one of basic CP zone resource region information indicating a resource region of the basic CP zone, CPRB size information indicating resource size of one CPRB, CPRB count information indicating the total number of CPRBs included in the basic CP zone, or information of the UL data transmitted through the CPRB.

The basic CP zone resource region information includes at least one of start resource information of the basic CP zone or last resource information of the basic CP zone.

The start resource information and the last resource information of the basic CP zone are set to a Resource Block (RB) index or an offset value.

The second control message is received through a (N−x)th subframe, and the UL data is transmitted through a Nth subframe.

The second control message is UL Grant or a system information message.

When the second control message is the UL Grant, CRC (Cyclical Redundancy Check) masking is performed on the second control message with an RNTI (Radio Network Temporary Identifier) newly defined for the CP zone resource allocation.

The newly defined RNTI is a CP-RNTI (Contention based PUSCH-Radio Network Temporary Identifier).

The second control message is transmitted through a PDCCH (Physical Downlink Control Channel). The receiving of the second control message includes blind decoding the C-RNTI and the CP-RNTI in a search space of the PDCCH.

When the second control message is the system information message, the CRC masking is performed on the second control message with an SI-RNTI (System Information-Radio Network Temporary Identifier).

The UE has data requiring the low latency.

In another aspect, there is a user equipment (UE) for transmitting uplink (UL) data requiring low latency in a wireless communication system comprising a radio frequency (RF) unit configured to transmit and receive an RF signal; and a processor configured to receive a first control message for informing a basic Contention-based PUSCH (Physical Uplink Shared Channel) Zone (CP zone) allocated to each subframe from an enhanced Node B (eNB), to receive a second control message for informing changes in a CP zone allocated to a specific subframe from the eNB, and to transmit UL data to the eNB through a CPRB (Contention PUSCH Resource Block) of the changed CP zone based on the received second control message, wherein the first control message includes basic CP zone resource information indicating resource information of the basic CP zone, and the second control message includes changed CP zone resource information indicating resource information of the changed CP zone.

Advantageous Effects

The present disclosure can further reduce entire procedure latency by configuring a basic CP zone in a cell and transmitting UL data without UL Grant, compared to the eNB scheduling-based UL data transmission.

Further, the present disclosure can prevent UL resource from being unnecessarily consumed through a method for dynamically configuring a CP zone in each subframe and can minimize the latency resulting from the transmission of scheduled UL data to a next subframe through the dynamically configured CP zone.

The effects of the present disclosure are not limited to the above-described effects and other effects which are not described herein will become apparent to those skilled in the art from the following description.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 1 shows an example of a network structure of an Evolved Universal Mobile Telecommunication System (E-UMTS), to which the present invention can be applied.

FIG. 2 illustrates a structure of a radio interface protocol between the E-UTRAN and a user equipment (UE) in a wireless communication system, to which the present invention can be applied.

FIG. 3 illustrates physical channels used in 3GPP LTE/LTE-A system applicable to the present invention and a general signal transmission method using the physical channels.

FIG. 4 illustrates a structure of a radio frame used in 3GPP LTE/LTE-A system, to which the present invention can be applied.

FIG. 5 shows an example of a resource grid for one downlink slot in a wireless communication system, to which the present invention can be applied.

FIG. 6 illustrates a structure of a downlink subframe in a wireless communication system, to which the present invention can be applied.

FIG. 7 illustrates a structure of an uplink subframe in a wireless communication system, to which the present invention can be applied.

FIG. 8 shows an example of an uplink resource allocation procedure of a UE in a wireless communication system, to which the present application can be applied.

FIG. 9 illustrates a latency in C-plane required in 3GPP LTE-A system, to which the present invention can be applied.

FIG. 10 illustrates a transition time from a dormant state to an active state of a synchronized UE required in 3GPP LTE-A system, to which the present invention can be applied.

FIG. 11 shows an example of a random access procedure.

FIG. 12 shows the configuration of a Contention-based PUSCH Zone (CP zone) and an example of a contention Physical Uplink Shared Channel (PUSCH) resource block.

FIG. 13 shows another example of a contention PUSCH resource block.

FIG. 14 shows an example of a method for transmitting information related to a CP zone.

FIG. 15 shows an example of a dynamically configured CP zone according to the present disclosure.

FIG. 16 is a flow chart showing an example of a method for dynamically configuring a CP zone according to the present disclosure.

FIG. 17 shows examples of various basic CP zone resource regions according to the present disclosure.

FIG. 18 is a flow chart showing an example of a method for configuring a dynamic CP zone according to the present disclosure.

FIGS. 19 to 21 are flow charts showing another example of a method for configuring a dynamic CP zone according to the present disclosure.

FIG. 22 is a block diagram of a wireless communication device, to which methods according to the present disclosure can be applied.

MODE FOR INVENTION

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the embodiments of the present invention, the enhanced Node B (eNode B or eNB) may be a terminal node of a network, which directly communicates with the terminal. In some cases, a specific operation described as performed by the eNB may be performed by an upper node of the eNB. Namely, it is apparent that, in a network comprised of a plurality of network nodes including an eNB, various operations performed for communication with a terminal may be performed by the eNB, or network nodes other than the eNB. The term 'eNB' may be replaced with the term 'fixed station', 'base station (BS)', 'Node B', 'base transceiver system (BTS),' 'access point (AP)', etc. The term 'user equipment (UE)' may be replaced with the term 'terminal', 'mobile station (MS)', 'user terminal (UT)', 'mobile subscriber station (MSS)', 'subscriber station (SS)', 'Advanced Mobile Station (AMS)', 'Wireless terminal (WT)', 'Machine-Type Communication (MTC) device', 'Machine-to-Machine (M2M) device', 'Device-to-Device (D2D) device', wireless device, etc.

In the embodiments of the present invention, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB.

Specific terms used for the embodiments of the present invention are provided to aid in understanding of the present invention. These specific terms may be replaced with other terms within the scope and spirit of the present invention.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), 'non-orthogonal multiple access (NOMA)', etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE.

For clarity, this application focuses on the 3GPP LTE/LTE-A system. However, the technical features of the present invention are not limited thereto.

General System to which the Present Invention May be Applied

FIG. 1 illustrates a schematic structure a network structure of an evolved universal mobile telecommunication system (E-UMTS) to which the present invention can be applied.

An E-UMTS system is an evolved version of the UMTS system. For example, the E-UMTS may be also referred to as an LTE/LTE-A system. The E-UMTS is also referred to as a Long Term Evolution (LTE) system.

The E-UTRAN consists of eNBs, providing the E-UTRA user plane and control plane protocol terminations towards the UE. The eNBs are interconnected with each other by means of the X2 interface. The X2 user plane interface (X2-U) is defined between eNBs. The X2-U interface provides non guaranteed delivery of user plane packet data units (PDUs). The X2 control plane interface (X2-CP) is defined between two neighbour eNBs. The X2-CP performs following functions: context transfer between eNBs, control of user plane tunnels between source eNB and target eNB, transfer of handover related messages, uplink load management and the like. Each eNB is connected to User Equipments (UEs) through a radio interface and is connected to an Evolved Packet Core (EPC) through an S1 interface. The S1 user plane interface (S1-U) is defined between the eNB and the serving gateway (S-GW). The S1-U interface provides non guaranteed delivery of user plane PDUs between the eNB and the S-GW. The S1 control plane interface (S1-MME) is defined between the eNB and the MME (Mobility Management Entity). The S1 interface performs following functions: EPS (Enhanced Packet System) Bearer Service Management function, NAS (Non-Access Stratum) Signaling Transport function, Network Sharing Function, MME Load balancing Function and the like. The S1 interface supports a many-to-many relation between MMEs/S-GWs and eNBs.

FIG. 2 illustrates the configurations of a control plane and a user plane of a radio interface protocol between the E-UTRAN and a UE in the wireless communication system to which the present invention can be applied.

FIG. 2(a) shows the respective layers of the radio protocol control plane, and FIG. 2(b) shows the respective layers of the radio protocol user plane.

Referring to the FIG. 2, the protocol layers of a radio interface protocol between the E-UTRAN and a UE can be divided into an L1 layer (first layer), an L2 layer (second layer), and an L3 layer (third layer) based on the lower three layers of the Open System Interconnection (OSI) reference model widely known in communication systems. The radio interface protocol is divided horizontally into a physical layer, a data link layer, and a network layer, and vertically into a user plane for data transmission and a control plane for signaling.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The MAC layer of the second layer provides a service to a Radio Link Control (RLC) layer, located above the MAC layer, through a logical channel. The MAC layer plays a role in mapping various logical channels to various transport channels. And, the MAC layer also plays a role as logical channel multiplexing in mapping several logical channels to one transport channel.

The RLC layer of the second layer supports reliable data transmission. The RLC layer performs segmentation and concatenation on data received from an upper layer to play a role in adjusting a size of the data to be suitable for a lower layer to transfer the data to a radio section. And, the RLC layer provides three kinds of RLC modes including a transparent mode (TM), an unacknowledged mode (UM) and an acknowledged mode (AM) to secure various kinds of QoS demanded by each radio bearer (RB). In particular, the AM RLC performs a retransmission function through automatic repeat and request (ARQ) for the reliable data transfer. The functions of the RLC layer may also be implemented through internal functional blocks of the MAC layer. In this case, the RLC layer need not be present.

A packet data convergence protocol (PDCP) layer of the second layer performs a header compression function for reducing a size of an IP packet header containing relatively large and unnecessary control information to efficiently transmit such an IP packet as IPv4 and IPv6 in a radio section having a small bandwidth. This enables a header part of data to carry mandatory information only to play a role in increasing transmission efficiency of the radio section. Moreover, in the LTE/LTE-A system, the PDCP layer performs a security function as well. This consists of ciphering for preventing data interception conducted by a third party and integrity protection for preventing data manipulation conducted by a third party.

A Radio Resource Control (RRC) layer located at the bottom of the third layer is defined only in the control plane and is responsible for control of logical, transport, and physical channels in association with configuration, reconfiguration, and release of Radio Bearers (RBs). The RB is a logical path that the second layer provides for data communication between the UE and the E-UTRAN. To accomplish this, the RRC layer of the UE and the RRC layer of the network exchange RRC messages. To Configure of Radio Bearers means that the radio protocol layer and the characteristic of channels are defined for certain service and that each of specific parameters and operating method are configured for certain service. The radio bearer can be divided signaling radio bearer (SRB) and data radio bearer (DRB). The SRB is used as a path for transmission RRC messages in the control plane, and the DRB is used as a path for transmission user data in the user plane.

A Non-Access Stratum (NAS) layer located above the RRC layer performs functions such as session management and mobility management.

One cell of the eNB is set to use a bandwidth such as 1.25, 2.5, 5, 10 or 20 MHz to provide a downlink or uplink transmission service to UEs. Here, different cells may be set to use different bandwidths.

Downlink transport channels for transmission of data from the network to the UE include a Broadcast Channel (BCH) for transmission of system information, a Paging Channel (PCH) for transmission of paging messages, and a downlink Shared Channel (DL-SCH) for transmission of user traffic or control messages. User traffic or control messages of a downlink multicast or broadcast service may be transmitted through DL-SCH and may also be transmitted through a downlink multicast channel (MCH). Uplink transport channels for transmission of data from the UE to the network include a Random Access Channel (RACH) for transmission of initial control messages and an uplink SCH (UL-SCH) for transmission of user traffic or control messages.

Logical channels, which are located above the transport channels and are mapped to the transport channels, include a Broadcast Control Channel (BCCH), a Paging Control Channel (PCCH), a Common Control Channel (CCCH), a dedicated control channel (DCCH), a Multicast Control Channel (MCCH), a dedicated traffic channel (DTCH), and a Multicast Traffic Channel (MTCH).

As an downlink physical channel for transmitting information forwarded on an downlink transport channel to a radio section between a network and a user equipment, there is a physical downlink shared channel (PDSCH) for transmitting information of DL-SCH, a physical control format indicator channel (PDFICH) for indicating the number of OFDM symbols used for transmitting a physical downlink control channel (PDCCH), a physical HARQ (hybrid automatic repeat request) indicator channel (PHICH) for transmitting HARQ ACK (Acknowledge)/NACK (Non-acknowledge) as response to UL transmission or a PDCCH for transmitting such control information, as DL grant indicating resource allocation for transmitting a Paging Channel (PCH) and DL-SCH, information related to HARQ, UL grant indicating resource allocation for transmitting a UL-SCH and like that. As an uplink physical channel for transmitting information forwarded on an uplink transport channel to a radio section between a network and a user equipment, there is a physical uplink shared channel (PUSCH) for transmitting information of UL-SCH, a physical random access channel (PRACH) for transmitting RACH information or a physical uplink control channel (PUCCH) for transmitting such control information, which is provided by first and second layers, as HARQ ACK/NACK (Non-acknowledge), scheduling request (SR), channel quality indicator (CQI) report and the like.

The NAS state model is based on a two-dimensional model which consists of EPS Mobility Management (EMM) states and of EPS Connection Management (ECM) states. The EMM states describe the mobility management states that result from the mobility management procedures e.g., Attach and Tracking Area Update procedures. The ECM states describe the signaling connectivity between the UE and the EPC.

In detail, in order to manage mobility of a UE in NAS layers positioned in control planes of the UE and an MME, an EPS mobility management REGISTERED (EMM-REGISTERED) state and an EMM-DEREGISTERED state may be defined. The EMM-REGISTERED state and the EMM-DEREGISTERED state may be applied to the UE and the MME.

The UE is in the EMM deregistered state, like a state in which power of the UE is first turned on, and in order for the UE to access a network, a process of registering in the corresponding network is performed through an initial access procedure. When the access procedure is successfully performed, the UE and the MME transition to an EMM-REGISTERED state.

Also, in order to manage signaling connection between the UE and the network, an EPS connection management CONNECTED (ECM-CONNECTED) state and an ECM-IDLE state may be defined. The ECM-CONNECTED state and the ECM-IDLE state may also be applied to the UE and the MME. The ECM connection may include an RRC connection established between the UE and a BS and an S1 signaling connection established between the BS and the MME. The RRC state indicates whether an RRC layer of the UE and an RRC layer of the BS are logically connected. That is, when the RRC layer of the UE and the RRC layer of the BS are connected, the UE may be in an RRC_CONNECTED state. When the RRC layer of the UE and the RRC layer of the BS are not connected, the UE in an RRC_IDLE state.

Here, the ECM and EMM states are independent of each other and when the UE is in EMM-REGISTERED state this does not imply that the user plane (radio and S1 bearers) is established In E-UTRAN RRC_CONNECTED state, network-controlled UE-assisted handovers are performed and various DRX cycles are supported. In E-UTRAN RRC_IDLE state, cell reselections are performed and DRX is supported.

The network may recognize the presence of the UE in the ECM-CONNECTED state by the cell and effectively control the UE. That is, when the UE is in the ECM-CONNECTED state, mobility of the UE is managed by a command from the network. In the ECM-CONNECTED state, the network knows about a cell to which the UE belongs. Thus, the network may transmit and/or receive data to or from the UE, control mobility such as handover of the UE, and perform cell measurement on a neighbor cell.

Meanwhile, the network cannot recognize the presence of the UE in the ECM-idle state and a core network (CN) manages the UE by the tracking area, a unit greater than cell. When the UE is in the ECM-idle state, the UE performs discontinuous reception (DRX) set by the NAS using an ID uniquely assigned in a tracking region. That is, the UE may monitor a paging signal at a particular paging opportunity in every UE-specific paging DRX cycle to receive broadcast of system information and paging information. Also, when the UE is in the ECM-idle state, the network does not have context information of the UE.

Thus, the UE in the ECM-idle state may perform a UE-based mobility-related procedure such as cell selection or cell reselection without having to receive a command from the network. When a location of the UE in the ECM-idle state is changed from that known by the network, the UE may inform the network about a location thereof through a tracking area update (TAU) procedure.

As described above, in order for the UE to receive a general mobile communication service such as voice or data, the UE needs to transition to an ECM-CONNECTED state. The UE is in the ECM-IDLE state like the case in which power of the UE is first turned on. When the UE is successfully registered in the corresponding network through an initial attach procedure, the UE and the MME transition to an ECM-CONNECTED state. Also, in a case in which the UE is registered in the network but traffic is deactivated so radio resource is not allocated, the UE is in an ECM-IDLE state, and when uplink or downlink new traffic is generated in the corresponding UE, the UE and the MME transition to an ECM-CONNECTED state through a service request procedure.

FIG. 3 illustrates physical channels and a view showing physical channels used for in the 3GPP LTE/LTE-A system to which the present invention can be applied.

When a UE is powered on or when the UE newly enters a cell, the UE performs an initial cell search operation such as synchronization with a BS in step S301. For the initial cell search operation, the UE may receive a Primary Synchronization Channel (P-SCH) and a Secondary Synchronization Channel (S-SCH) from the BS so as to perform synchronization with the BS, and acquire information such as a cell ID.

Thereafter, the UE may receive a physical broadcast channel (PBCH) from the BS and acquire broadcast information in the cell. Meanwhile, the UE may receive a Downlink Reference signal (DL RS) in the initial cell search step and confirm a downlink channel state.

The UE which completes the initial cell search may receive a Physical Downlink Control Channel (PDCCH) and a Physical Downlink Shared Channel (PDSCH) corresponding to the PDCCH, and acquire more detailed system information in step S302.

Thereafter, the UE may perform a random access procedure in steps S303 to S306, in order to complete the access to the BS. For the random access procedure, the UE may transmit a preamble via a Physical Random Access Channel (PRACH) (S303), and may receive a message in response to the preamble via the PDCCH and the PDSCH corresponding thereto (S304). In contention-based random access, a contention resolution procedure including the transmission of an additional PRACH (S305) and the reception of the PDCCH and the PDSCH corresponding thereto (S306) may be performed.

The UE which performs the above-described procedure may then receive the PDCCH/PDSCH (S307) and transmit a Physical Uplink Shared Channel (PUSCH)/Physical Uplink Control Channel (PUCCH) (S308), as a general uplink/downlink signal transmission procedure.

Control information transmitted from the UE to the BS is collectively referred to as uplink control information (UCI). The UCI includes hybrid automatic repeat and request acknowledgement/negative-acknowledgement (HARQ ACK/NACK), scheduling request (SR), channel quality information (CQI), preceding matrix indicator (PMI), rank indication (RI), etc. In the embodiments of the present invention, CQI and/or PMI are also referred to as channel quality control information.

In general, although a UCI is periodically transmitted via a PUCCH in the LTE system, this may be transmitted through a PUSCH if control information and traffic data are simultaneously transmitted. In addition, a UCI may be aperiodically transmitted via a PUSCH according to a network request/instruction.

FIG. 4 is a diagram showing the structure of a radio frame used in a 3GPP LTE system to which the present invention can be applied.

In a cellular OFDM radio packet communication system, uplink/downlink data packet transmission is performed in subframe units and one subframe is defined as a predetermined duration including a plurality of OFDM symbols. The 3GPP LTE standard supports a type-1 radio frame structure applicable to frequency division duplex (FDD) and a type-2 radio frame structure applicable to time division duplex (TDD). According to the FDD scheme, the UL transmission and the DL transmission are performed by occupying different frequency bandwidths. According to the TDD scheme, the UL transmission and the DL transmission are performed on respective times different from each other while occupying the same frequency bandwidth. The channel response in the TDD scheme is substantially reciprocal. This signifies that the DL channel response and the UL channel response are about the same in a given frequency domain. Accordingly, there is a merit that the DL channel response can be obtained from the UL channel response in wireless communication systems based on the TDD. In the TDD scheme, since entire frequency bandwidth is timely divided in the UL transmission and the DL transmission, the DL transmission by an eNB and the UL transmission by a UE may not be performed simultaneously. In the TDD system in which the UL transmission and the DL transmission are distinguished by a unit of subframe, the UL transmission and the DL transmission are performed in different subframes.

FIG. 4(a) shows the structure of the type-1 radio frame. A downlink radio frame includes 10 subframes and one subframe includes two slots in a time domain. A time required to transmit one subframe is referred to as a transmission time interval (TTI). For example, one subframe has a length of 1 ms and one slot has a length of 0.5 ms. One slot includes a plurality of OFDM symbols in a time domain and includes a plurality of resource blocks (RBs) in a frequency domain. In the 3GPP LTE system, since OFDMA is used in the downlink, an OFDM symbol indicates one symbol period. The OFDM symbol may be referred to as an SC-FDMA symbol or symbol period. A RB as a resource allocation unit may include a plurality of consecutive subcarriers in one slot.

The number of OFDM symbols included in one slot may be changed according to the configuration of cyclic prefix (CP). CP includes an extended CP and a normal CP. For example, if OFDM symbols are configured by the normal CP, the number of OFDM symbols included in one slot may be 7. If OFDM symbols are configured by the extended CP, since the length of one OFDM symbol is increased, the number of OFDM symbols included in one slot is less than the number of OFDM symbols in case of the normal CP. In case of the extended CP, for example, the number of OFDM symbols included in one slot may be 6. In the case where a channel state is unstable, such as the case where a UE moves at a high speed, the extended CP may be used in order to further reduce inter-symbol interference.

In case of using the normal CP, since one slot includes seven OFDM symbols, one subframe includes 14 OFDM symbols. At this time, a maximum of three first OFDM symbols of each subframe may be allocated to a physical downlink control channel (PDCCH) and the remaining OFDM symbols may be allocated to a physical downlink shared channel (PDSCH).

FIG. 4(b) shows the structure of the type-2 radio frame. The type-2 radio frame includes two half frames and each half frame includes five subframes, a downlink pilot time slot (DwPTS), a guard period (GP) and an uplink pilot time slot (UpPTS). From among these, one subframe includes two slots. The DwPTS is used for initial cell search, synchronization or channel estimation of a UE. The UpPTS is used for channel estimation of a BS and uplink transmission synchronization of a UE. The GP is used to eliminate interference generated in the uplink due to multi-path delay of a downlink signal between the uplink and the downlink.

The structure of the radio frame is only exemplary and the number of subframes included in the radio frame, the number of slots included in the subframe, or the number of symbols included in the slot may be variously changed.

FIG. 5 shows an example of a resource grid for one downlink slot in the wireless communication system to which the present invention can be applied.

Referring to the FIG. 5, the downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block includes 12*7 resource elements. The resource element on the resource grid may be identified by an index pair (k, l) in the slot. Here, k (k=0, . . . , NRB×12−1) denotes an index of subcarrier in the frequency domain, and l (l=0, . . . , 6) denotes an index of symbol in the time domain. The number NDL of resource blocks included in the downlink slot depends on a downlink transmission bandwidth determined in a cell.

FIG. 6 shows a structure of a downlink subframe in the wireless communication system to which the present invention can be applied.

Referring to the FIG. 6, a maximum of three OFDM symbols located in a front portion of a first slot in a subframe correspond to a control region to be assigned with control channels. The remaining OFDM symbols correspond to a data region to be assigned with physical downlink shared channels (PDSCHs).

Examples of downlink control channels used in the 3GPP LTE include a physical control format indicator channel (PCFICH), a physical downlink control channel (PDCCH), a physical hybrid-ARQ indicator channel (PHICH), etc. The PCFICH transmitted in a 1st OFDM symbol of a subframe carries information regarding the number of OFDM symbols (i.e., a size of a control region) used for transmission of control channels in the subframe. Control information transmitted over the PDCCH is referred to as downlink control information (DCI). The DCI transmits uplink resource assignment information, downlink resource assignment information, an uplink transmit power control (TPC) command for any UE groups, etc. The PHICH carries an acknowledgement (ACK)/not-acknowledgement (NACK) signal for an uplink hybrid automatic repeat request (HARQ). That is, the ACK/NACK signal for uplink data transmitted by a UE is transmitted over the PHICH.

A BS determines a PDCCH format according to DCI to be transmitted to a UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indication identifier (e.g., paging-RNTI (P-RNTI)) may be masked to the CRC. If the PDCCH is for system information, a system information identifier (e.g., system information-RNTI (SI-RNTI)) may be masked to the CRC. To indicate a random access response that is a response for transmission of a random access preamble of the UE, a random access-RNTI (RA-RNTI) may be masked to the CRC.

FIG. 7 shows a structure of an uplink subframe in the wireless communication system to which the present invention can be applied.

Referring to the FIG. 7, the uplink subframe can be divided in a frequency domain into a control region and a data region. The control region is allocated with a physical uplink control channel (PUCCH) for carrying uplink control information. The data region is allocated with a physical uplink shared channel (PUSCH) for carrying user data. In case of being indicated from higher layer, UE can simultaneously transmit the PUCCH and the PUSCH.

The PUCCH for one UE is allocated to an RB pair in a subframe. RBs belonging to the RB pair occupy different subcarriers in respective two slots. This is called that the RB pair allocated to the PUCCH is frequency-hopped in a slot boundary.

Physical Downlink Control Channel (PDCCH)

The control information transmitted through the PDCCH is referred to as a downlink control indicator (DCI). In the PDCCH, a size and use of the control information are different according to a DCI format. In addition, a size of the control information may be changed according to a coding rate.

Table 1 indicates the DCI according to the DCI format.

TABLE 1

| DCI format | Objectives |
| --- | --- |
| 0 | Scheduling of PUSCH |
| 1 | Scheduling of one PDSCH codeword |
| 1A | Compact scheduling of one PDSCH codeword |
| 1B | Closed-loop single-rank transmission |
| 1C | Paging, RACH response and dynamic BCCH |
| 1D | MU-MIMO |
| 2 | Scheduling of rank-adapted closed-loop spatial multiplexing mode |
| 2A | Scheduling of rank-adapted open-loop spatial multiplexing mode |
| 3 | TPC commands for PUCCH and PUSCH with 2bit power adjustments |
| 3A | TPC commands for PUCCH and PUSCH with single bit power adjustments |
| 4 | The scheduling of PUSCH in one UL cell with multi-antenna port transmission mode |

Referring to Table 1, the DCI format includes format 0 for the PUSCH scheduling, format 1 for scheduling of one PDSCH codeword, format 1A for compact scheduling of one PDSCH codeword, format 1C for very compact scheduling of the DL-SCH, format 2 for PDSCH scheduling in a closed-loop spatial multiplexing mode, format 2A for PDSCH scheduling in an open-loop spatial multiplexing mode, formats 3 and 3A for transmitting a transmission power control (TPC) command for a UL channel, and format 4 for PUSCH scheduling within one UL cell in a multiple antenna port transmission mode.

DCI format 1A may be used for PDSCH scheduling whichever transmission mode is configured to a UE.

Such DCI formats may be independently applied to each UE, and the PDCCHs of several UEs may be simultaneously multiplexed in one subframe. The PDCCH is comprised of an aggregation of one or a few continuous control channel elements (CCEs). The CCE is a logical allocation unit used for providing a coding rate according to a state of radio channel to the PDCCH. The CCE is referred to as a unit that corresponds to nine sets of resource element group (REG) which is comprised of four resource elements. An eNB may use {1, 2, 4, 8} CCEs for constructing one PDCCH signal, and this {1, 2, 4, 8} is called a CCE aggregation level. The number of CCE used for transmitting a specific PDCCH is determined by the eNB according to the channel state. The PDCCH configured according to each UE is mapped with being interleaved to a control channel region of each subframe by a CCE-to-RE mapping rule. A location of the PDCCH may be changed according to the number of OFDM symbols for the control channel, the number of PHICH group, a transmission antenna, a frequency shift, etc.

As described above, a channel coding is independently performed for the PDCCH of each multiplexed UE, and the cyclic redundancy check (CRC) is applied. By masking each UE ID to CRC, the UE may receive its PDCCH. However, in the control region allocated in a subframe, the eNB does not provide information on where the PDCCH that corresponds to the UE is. Since the UE is unable to know on which position its PDCCH is transmitted with which CCE aggregation level and DCI format in order to receive the control channel transmitted from the eNB, the UE finds its own PDCCH by monitoring a set of PDCCH candidates in a subframe. This is called a blind decoding (BD). The blind decoding may also be called a blind detection or a blind search. The blind decoding signifies a method of verifying whether the corresponding PDCCH is its control channel by checking CRC errors, after the UE de-masks its UE ID in CRC part.

Uplink Resource Allocation Procedure

In 3GPP LTE/LTE-A system, in order to maximize resource utilization, the data transmission and reception method based on scheduling of an eNB is used. This signifies that if there are data to transmit by a UE, the UL resource allocation is preferentially requested to the eNB, and the data may be transmitted using only UL resources allocated by the eNB.

FIG. 8 illustrates a UL resource allocation procedure of a UE in the wireless communication system to which the present application can be applied.

For effective utilization of the UL radio resources, an eNB should know which sorts and what amount of data to be transmitted to the UL for each UE. Accordingly, the UE itself may forward the information of UL data to transmit, and the eNB may allocate the UL resources to the corresponding UE based on this. In this case, the information of the UL data that the UE forwards to the eNB is the quality of UL data stored in its buffer, and this is referred to as a buffer status report (BSR). The BSR is transmitted using a MAC control element in case that the resources on the PUSCH in current TTI are allocated to the UE and the reporting event is triggered.

FIG. 8(*a*) exemplifies a UL resource allocation procedure for actual data in case that the UL radio resources for the buffer status reporting (BSR) are not allocated to a UE. That is, for a UE that switches a state of active mode in the DRX mode, since there is no data resource allocated beforehand, the resource for UL data should be requested starting from the SR transmission through the PUCCH, in this case, the UL resource allocation procedure of 5 steps is used.

Referring to FIG. 8(*a*), the case that the PUSCH resource for transmitting the BSR is not allocated to a UE is illustrated, and the UE transmits the scheduling request (SR) to an eNB first in order to be allocated with the PUSCH resources (step S801).

The scheduling request (SR) is used to request in order for the UE to be allocated with the PUSCH resource for UL transmission in case that the reporting event is occurred but the radio resource is not scheduled on the PUSCH in current TTI. That is, the UE transmits the SR on the PUCCH when the regular BSR is triggered but does not have the UL radio resource for transmitting the BSR to the eNB. The UE transmits the SR through the PUCCH or starts the random access procedure according to whether the PUCCH resources for the SR are configured. In particular, the PUCCH resources in which the SR can be transmitted may be determined as a combination of the PRB through which the SR is transmitted, the cyclic shift (CS) applied to a basic sequence (e.g., ZC sequence) for spread in frequency domain of the SR and an orthogonal code (OC) for spread in time domain of the SR. Additionally, the SR periodicity and the SR subframe offset information may be included. The PUCCH resources through which the SR can be transmitted may be configured by a higher layer (e.g., the RRC layer) in UE-specific manner.

When a UE receives the UL grant for the PUSCH resources for BSR transmission from an eNB (step S803), the UE transmits the triggered BSR through the PUSCH resources which are allocated by the UL grant (step S805).

The eNB verifies the quality of data that the UE actually transmit to the UL through the BSR, and transmits the UL grant for the PUSCH resources for actual data transmission to the UE (step S807). The UE that receives the UL grant for actual data transmission transmits the actual UL data to the eNB through the PUSCH resources (step S809).

FIG. 8(*b*) exemplifies the UL resource allocation procedure for actual data in case that the UL radio resources for the BSR are allocated to a UE.

Referring to FIG. 8(*b*), the case that the PUSCH resources for BRS transmission are already allocated to a UE is illustrated. In the case, the UE transmits the BSR through the allocated PUSCH resources, and transmits a scheduling request to an eNB (step S811). Subsequently, the eNB verifies the quality of data to be transmitted to the UL by the UE through the BSR, and transmits the UL grant for the PUSCH resources for actual data transmission to the UE (step S813). The UE that receives the UL grant for actual data transmission transmits the actual UL data to the eNB through the allocated PUSCH resources (step S815).

FIG. 9 is a diagram for describing a latency in C-plane required in 3GPP LTE-A to which the present invention can be applied.

Referring to FIG. 9, 3GPP LTE-A requests a transition time from an idle mode (a state where IP address is allocated) to a connected mode to be less than 50 ms. In this instance, the transition time includes a configuration time (except latency for transmitting S1) in a user plane (U-plane). In addition, a transition time from a dormant state to an active state in the connection mode is requested to be less than 10 ms.

The transition from the dormant state to the active state may occur in 4 scenarios as follows.

Uplink initiated transition, synchronized
Uplink initiated transition, unsynchronized
Downlink initiated transition, synchronized
Downlink initiated transition, unsynchronized FIG. 10 is a diagram for describing a transition time from the dormant state to the active state for a synchronized UE required in 3GPP LTE-A to which the present invention can be applied.

In FIG. 10, the UL resource allocation procedure of 3 steps (in case of UL radio resources for the BSR are allocated) described in FIG. 8 above is illustrated. In LTE-A system, the latency is required for UL resource allocation as represented in Table 2 below.

Table 2 represents a transition time from the dormant state to the active state initiated by a UL transmission, in case of a synchronized UE which is required in LTE-A system.

TABLE 2

| Component | Description | Time (ms) |
|---|---|---|
| 1 | Average delay to next SR opportunity (1 ms/5 ms PUCCH cycle) | 0.5/2.5 |
| 2 | UE sends Scheduling Request | 1 |
| 3 | eNB decodes Scheduling Request and generates the Scheduling Grant | 3 |
| 4 | Transmission of Scheduling Grant | 1 |
| 5 | UE Processing Delay (decoding of scheduling grant + L1 encoding of UL data) | 3 |
| 6 | Transmission of UL data | 1 |
|  | Total delay | 9.5/11.5 |

Referring to FIG. 10 and Table 2, as an average delay due to a RACH scheduling section that has a RACH cycle of 1 ms/5 ms, 0.5 ms/2.5 ms is required, and 1 ms is required for a UE to transmit the SR. And 3 ms is required for an eNB to decode the SR and generate the scheduling grant, and 1 ms is required to transmit the scheduling grant. And 3 ms is required for a UE to decode the scheduling grant and encode the UL data in L2 layer, and 1 ms is required to transmit the UL data.

As such, total 9.5/15.5 ms are required for a UE to complete a procedure of transmitting the UL data.

Random Access Procedure (RACH Procedure)

FIG. 11 shows an example of a random access procedure in a LTE system.

The random access procedure is performed when an initial access in RRC_IDLE, an initial access after the failure of a wireless link, a handover requesting the random access procedure, or the uplink data or the downlink data requesting the random access procedure during RRC_CONNECTED is generated. A partial RRC message, such as an RRC connection request message, a cell update Message, and an URA (UTRAN Registration Area) update message, is transmitted using the random access procedure. The logical channels such as the CCCH (Common Control Channel), the DCCH (Dedicated Control Channel), and the DTCH (Dedicated Traffic Channel) may be mapped to the transmission channel, for example, the RACH (Random Access Channel). The RACH of the transmission channel is mapped to the physical channel, for example, the PRACH (Physical Random Access Channel).

When the MAC layer of the UE instructs the UE physical layer to transmit the PRACH, the UE physical layer selects one access slot and one signature and transmits a PRACH preamble upward. The random access procedure is divided into a contention-based random access procedure and a non-contention based random access procedure.

FIG. 11(*a*) shows an example of the contention-based random access procedure, and FIG. 11(*b*) shows an example of a non-contention based random access procedure.

First, the contention-based random access procedure is described with reference to FIG. 11(*a*).

The UE receives and stores information about the random access from the eNB through system information. Afterwards, when the random access is needed, the UE transmits a random access preamble (referred to as "message 1") to the eNB in step S1101.

When the eNB receives the random access preamble from the UE, the eNB transmits a random access response (referred to as "message 2") to the UE in step S1102. More specifically, the CRC masking is performed on downlink scheduling information about the random access response with the RA-RNTI (Random Access-Radio Network Temporary Identifier) and may be transmitted on L1 or L2 control channel, for example, the PDCCH. The UE receiving the CRC masked downlink scheduling information receives the random access response from the PDSCH (Physical Downlink Shared Channel) and may decode the random access response. Afterwards, the UE confirms whether or not the random access response has random access response information which the UE is instructed to receive.

The UE may confirm whether or not there is the random access response information, by checking whether or not there is RAID (Random Access Preamble ID) for the preamble the UE transmits.

The random access response information includes TA (Timing Alignment) indicating timing offset information for the synchronization, wireless resource allocation information used in the uplink, a temporary identifier (e.g., Temporary C-RNTI) for identifying the UE, and the like.

When the UE receives the random access response information, the UE performs uplink transmission (referred to as "message 3") through an uplink Shared Channel (SCH) depending on the wireless resource allocation information included in the random access response information, in step S1103. The uplink transmission may be expressed as scheduled transmission.

After the eNB receives the uplink transmission from the UE, the eNB transmits a message (referred to as "message 4") for contention resolution to the UE through downlink shared channel (DL-SCH) in step S1104.

Next, the non-contention based random access procedure is described with reference to FIG. 11(*b*).

Before the UE transmits the random access preamble, the eNB allocates a non-contention random access preamble to the UE in step S1111.

The non-contention random access preamble may be allocated through dedicated signaling such as a handover command and the PDCCH. When the non-contention random access preamble is allocated to the UE, the UE transmits the allocated non-contention random access preamble to the eNB in step S1112.

Afterwards, the eNB may transmit a random access response (referred to as "message 2") to the UE similarly to the step S1102 of the contention-based random access procedure, in step S1113.

The HARQ (hybrid automatic repeat request) is not applied to the random access response in the above-described random access procedure, but may be applied to the uplink transmission with respect to the random access response or the message for the contention resolution. Thus, the UE does not need to transmit ACK (Acknowledge) or NACK (Non-acknowledge) with respect to the random access response.

Hereinafter, a definition, a configuration method, a use method, etc. of contention-based PUSCH zone (hereinafter referred to as "CP zone") are described in detail as a method for minimizing C-plane latency of the UE in 5G system (or Future IMT-Advanced system) with reference to the accompanying drawings.

Definition and Configuration of CP Zone

FIG. 12(a) shows an example of the configuration of the CP zone, and FIG. 12(b) shows an example of a Contention PUSCH Resource Block (CPRB) constituting the CP zone.

The CP zone indicates a zone where the UE can directly transmit the UL data without separate resource allocation scheduling from the eNB in relation to the transmission of the UL data of the UE.

The CP zone may be mainly used to transmit the UL data of the UE requiring the low latency.

Referring to FIG. 12(a), '1210' denotes a resource region, to which the PUCCH is transmitted, and '1220' denotes the CP zone.

The CP zone may be allocated to a specific resource region of a PUSCH region capable of transmitting the UL data. Namely, the CP zone may be allocated to one subframe (SF) or one or more successive subframes and may not be allocated to a specific subframe.

FIG. 12(b) shows the CPRB. The CP zone may be comprised of one or more CPRBs.

The CPRB indicates a resource region inside the CP zone one UE can occupy.

One UE is mapped to one CPRB 1230, but the present disclosure is not limited thereto. For example, the plurality of CPRBs may be mapped to one UE in consideration of a capability of the UE, an amount of the UL data the UE will transmit, etc. Alternatively, the plurality of UEs may share one CPRB.

As shown in FIG. 12(b), N CPRBs may be defined in one CP zone, where N is a natural number.

For example, when there are three UEs UE1, UE2, and UE3 using the CP zone and four CPRBs CPRB #1, CPRB #2, CPRB #3, and CPRB #4 constituting the CP zone, the CPRB #1, the CPRB #2, and the CPRB #3 may be respectively allocated to the UE1, the UE2, and the UE3.

The CPRB allocated to each UE may be configured by the eNB. Alternatively, when the UE receives CPRB-related information of the CP zone from the eNB, the CPRB may be allocated to each UE as each UE requests the desired CPRB from the eNB.

When the eNB allocates the CPRB to each UE in a small cell, in which the number of UEs (or the number of users) the cell can accommodate is limited, the eNB may perform one-to-one mapping between the UEs entering into the cell and the CPRBs.

For example, when the maximum number of UEs the small cell can accommodate is N, the eNB of the small cell previously allocates the CP zone for the N UEs and blocks the remaining UE exceeding the N UEs from entering into the small cell. Hence, the one-to-one mapping between the UEs and the CPRBs in the small cell may be performed.

When a one-to-one mapping method between the UEs and the CPRBs is used for the RACH procedure after the cell entry of the UEs, a CPRB allocation method is implicitly promised between the UEs and the eNB before the cell entry of the UEs. Namely, when the UE having the connectivity with a macrocell is additionally connected to the small cell through dual connectivity, the CPRB may be previously allocated to the UE through a backhaul interface between the small cell and the macrocell.

In the embodiment disclosed herein, the dual connectivity refers to a technology, such as anchor-booster, carrier aggregation, and simultaneous multi-RAT communication.

Namely, when the UE positioned in the cell, to which the CP zone is configured, has the UL data requiring the low latency, the UE may directly transmit the UL data to the eNB through the configured CP zone without the scheduling (i.e., without UL Grant) of the eNB for the UL data transmission.

It is preferable, but not required, that the CP zone is widely used in the UL data transmission of the UE requiring the low latency. However, the CP zone may be restrictively used in the UL data (for example, RRC request message and/or NAS request message of the random access procedure, BSR transmission in BSR procedure, etc.) to be transmitted in a specific procedure.

As shown in FIG. 13, the CP zone may be differently configured in the procedures.

The CP zone may be defined as one or more zones depending on the purpose. For example, the CP zone for the RACH procedure and the CP zone for the BSR procedure may be differently configured. Namely, the CP zones defined depending on the different purposes may be respectively configured in different subframes or different resource regions of the same subframe.

FIG. 13 shows that the CP zone for the RACH procedure and the CP zone for another procedure, for example, the BSR procedure are differently configured.

Method for Transmitting Information Related to CP Zone

FIG. 14 shows an example of a method for transmitting information related to the CP zone.

When the CP zone is configured in a specific cell, the eNB (or the specific cell) transmits control information related to the CP zone configured in the specific cell to the UEs (inside the specific cell) in step S1410.

The specific cell may mean the small cell, such as a femtocell, a picocell, and a microcell, or the macrocell.

The control information related to the CP zone includes CP zone configuration notification information indicating whether or not the CP zone is configured in the specific cell.

When the CP zone is configured in the specific cell, the control information related to the CP zone further includes CP zone configuration information related to the configuration of the CP zone.

The CP zone configuration information may include UL resource information, in which the CP zone is configured, and information related to the data transmission, that will be transmitted to the CPRB in the CP zone.

The UL resource information, in which the CP zone is configured, may include information of an UL subframe, in which the CP zone is not configured, in consideration of resource utilization.

As described above, one CP zone may be comprised of N CPRBs one or more UEs can occupy, where N is a natural number.

The UL resource information, in which the CP zone is configured, may include a value indicating the number 'M' of CP zones, in which any one UE can attempt to occupy the resource of the CP zone at a specific time.

In the embodiment disclosed herein, a value of 'N*M' indicates the total number of CPRBs, which any one UE can select (or occupy) at a specific time point.

For example, if two CP zones of the same purpose having four CPRBs exist in one CP zone (i.e., when the two CP zones form one CP group), the UE may have eight (=4*2) candidate CPRBs.

The information related to the data transmission, which may be transmitted to the configured CPRB, may include maximum resource block size, a MCS (Modulation and Coding Scheme) level, an initial transmission power reference signal, etc. of each UE.

The control information related to the CP zone may be transmitted to a broadcast message, or may be transmitted to a unicast message for the specific UE.

More specifically, the control information related to the CP zone may be transmitted through the four following manners. Other manners may be used.

Firstly, the control information related to the CP zone may be transmitted to the UE through MIB (Master Information Block). The control information related to the CP zone may be included in the MIB transmitting essential physical layer information.

Secondly, the control information related to the CP zone may be transmitted to the UE through the existing SIB-x.

When the control information is transmitted to the UE through the SIB-x, the CP zone is configured for the initial network access. In this instance, the control information related to the CP zone may be included in SIB-2 and may be transmitted to the UE.

For example, it should be previously recognized that when the CP zone is configured for the RACH procedure, the CP zone may access to the cell through the contention-based RRC connection request message transmission (for example, 2-step RA) by adding the information related to the CP zone to the SIB-2, before the UE accesses to the cell.

Thirdly, the control information related to the CP zone may be transmitted to the UE through new SIB-y.

Namely, when the CP zone is configured for the procedure after the network access, the control information related to the CP zone may be transmitted to the UE through new SIB definition.

The eNB causes an indication indicating the cell, which has to receive new SIB information, to be included in MIB, SIB-1, or SIB-2 and may transmit them to the UE.

Fourthly, the control information related to the CP zone may be transmitted to the specific UE through the new control message using the unicast manner.

When the UE accesses the cell, the control information related to the CP zone is transmitted only to the UE, which needs to use the CP zone, through the unicast message. Thus, the control information related to the CP zone may be transmitted only to the specific UE.

In this instance, when the UE accesses (or enters) to the cell, information informing the use of the CP zone is included in a message, which indicates the transmission to the eNB when the UE accesses to the cell, and is transmitted to the eNB. Hence, the eNB can transmit the control information related to the CP zone to the UE through the unicast message.

As described above, the CP zone configuration notification information and the CP zone configuration information are included in the control information related to the CP zone and may be transmitted to the UEs through the various manners (for example, SIB, MIB, unicast message, etc.). The CP zone configuration notification information and the CP zone configuration information may be individually transmitted through different messages.

Even when the CP zone configuration notification information and the CP zone configuration information are individually transmitted, the CP zone configuration notification information and the CP zone configuration information may be transmitted through the various manners including SIB, MIB, unicast message, etc.

Method for Dynamically Configuring a Contention-Based PUSCH Zone (CP Zone)

When the CP zone is used in the wireless communication system for transmitting the UL data through the UL resource allocation based on the scheduling of the eNB, the eNB has to previously define the PUSCH resource corresponding to the CP zone.

The eNB has to separate a scheduled UL resource region and the CP zone from each other and has to previously configure them, so that a conflict does not occur during the transmission of the UL data through non-contention based scheduled UL resource region and contention-based UL resource region (CP zone).

To apply various embodiments of the invention, the non-contention based scheduled UL resource region may be represented as a first UL resource region, and the contention-based UL resource region (i.e., the CP zone) may be represented as a second UL resource region.

However, when the first UL resource region and the second UL resource region are always previously fixedly occupied, the number of UEs, which have to be scheduled, increases. Further, when there is the unused contention-based UL resource region, the resource may be unnecessarily consumed.

Hereinafter, a method for dynamically configuring the CP zone based on the scheduled UL resource of the cell is described in detail, so as to mitigate the inefficiency of the resource through the configuration of the CP zone.

To dynamically configure the CP zone, (1) a definition of a basic CP zone/a basic CPRB in the cell, and (2) the method for dynamically configuring the CP zone of an Nth subframe are described below.

In (2), the CP zone of the nth subframe may be configured through the physical downlink control channel (PDCCH) or the Physical Downlink Shared Channel (PDSCH) of a (N−x)th subframe.

The present disclosure is described using the (N−4)th subframe when x is "4", as an example, for the sake of brevity and ease of reading. However, other values may be used for "x" in consideration of processing delay of the UE and a system TTI (transmission timing interval).

The CP zone, the CP zone resource, and the CP zone resource region used in the present disclosure indicate the contention-based UL resource region and can be understood as the same meaning. Hereinafter, the above terms may be together used as the same meaning for the sake of brevity and ease of reading.

FIG. 15 shows an example of the dynamically configured CP zone according to the present disclosure.

As shown in FIG. 15, the PUCCH and the PUSCH are allocated to the UL resource region, and the PUCCH is allocated to an upper portion and a lower portion of a frequency resource region.

The PUSCH is allocated to the UL resource region except the UL resource region, to which the PUCCH is allocated. The UL resource region scheduled in the region, to which the PUSCH is allocated, and the CP zone may be separated and configured.

The CP zone may be individually configured in the subframes, and the sizes of the CP zones individually allocated to the subframes may be differently set.

FIG. 16 is a flow chart showing an example of a method for dynamically configuring the CP zone according to the present disclosure.

The method for dynamically configuring the CP zone includes configuring (or allocating) the basic CP zone in the cell and configuring a real CP zone, which may be dynamically configured, in each subframe with reference to resource information of the basic CP zone.

The real CP zone may be configured, if necessary or desired.

The basic CP zone indicates basic information of the contention-based UL resource region, which may be configured (or allocated) in each subframe. The basic CP zone may be represented as the CP zone or the reference CP zone of the cell.

The basic CP zone may be differentiated from the non-contention based scheduled UL resource region and may be configured on the PUSCH region.

The resource information of the basic CP zone (i.e., the basic CP zone resource information) may be used as a reference value of the real CP zone, which may be changed in each subframe.

The basic CP zone resource information may include basic CP zone resource region information, information of resource size of one CPRB, information of the number "N" of CPRBs inside the basic CP zone, information of the UL data which will be transmitted through the CPRB, and the like.

The basic CP zone resource region information is information indicating the UL resource region of the basic CP zone and may be represented as RB index, a start offset value and/or an end offset value of the CP zone resource, etc.

Namely, the basic CP zone resource region information may indicate information at a boundary between the basic CP zone resource region information and the scheduled UL resource region using the RB index, the start offset value and/or the end offset value of the CP zone resource, etc.

The basic CP zone resource region using the start offset value and/or the end offset value of the CP zone resource is described in detail below with reference to FIG. 17.

At least one CPRB may be defined in the basic CP zone.

The information of the UL data, which will be transmitted through the CPRB, may include maximum data size per the UE, MCS level, initial transmission power reference, and the like.

As shown in FIG. 14, the basic CP zone resource information is included in the control information related to the CP zone and may be transmitted.

Thus, the basic CP zone resource information may be transmitted through a system information message, for example, SIB (System Information Block).

The description related to the method for transmitting the basic CP zone resource information refers to FIG. 14.

FIG. 17 shows examples of various basic CP zone resource regions according to the present disclosure.

More specifically, FIG. 17(a) shows an example of the CP zone resource region using the start offset value and the end offset value of the CP zone resource; FIG. 17(b) shows an example of the CP zone resource region using only the start offset value of the CP zone resource; and FIG. 17(c) shows an example of the CP zone resource region using only the end offset value of the CP zone resource.

As shown in FIG. 17(a), the basic CP zone resource region may be represented as a start resource offset value of the CP zone and a last resource offset value of the CP zone.

In this instance, the basic CP zone resource region information may include the start resource offset value of the basic CP zone resource region and the last resource offset value of the basic CP zone resource region.

As shown in FIG. 17(b), the basic CP zone resource region may be represented as only a start resource offset value of the CP zone.

Namely, when the basic CP zone resource region is defined as the last resource region of each UL resource, the basic CP zone resource region information may include only the start resource offset value of the basic CP zone.

As shown in FIG. 17(c), the basic CP zone resource region may be represented as only a last resource offset value of the CP zone.

Namely, when the basic CP zone resource region is defined as the start resource region of each UL resource, the basic CP zone resource region information may include only the last resource offset value of the basic CP zone.

FIG. 17(d) illustrates at least one basic CPRB constituting the basic CP zone.

As shown in FIG. 17(d), N CPRBs may be included in one basic CP zone resource region.

A method for dynamically configuring the CP zone only in the Nth subframe is described in detail below.

When a traffic amount of the UL data increases due to an increase in the number of UEs at a specific time point, the eNB has to delay the UL resource, which has to be allocated to the UE trough the scheduling, in a next subframe because of the restriction of the UL resource resulting from the configuration of the CP zone. In this instance, the latency is generated in the transmission of the UL data.

Thus, a method for temporarily reducing the previously configured CP zone only at a time point when the scheduled UL resource of the eNB is lack, to increase the scheduled UL resource allocable to the UE is described below.

Namely, the CP zone resource region may be dynamically configured only in the specific subframe using the above-described basic CP zone resource information as the reference.

Further, the method for configuring the CP zone only in the specific subframe may be used to increase the CP zone when the UL resource of the Nth subframe, which has to be scheduled, much remains in the (N−4)th subframe.

FIG. 18 is a flow chart showing an example of a method for configuring the dynamic CP zone according to the present disclosure.

Namely, information (i.e. CP zone resource information) about the CP zone of the Nth subframe may be transmitted through the physical downlink channel, for example, the PDCCH or the PDSCH of the (N−x)th subframe, so as to dynamically configure the CP zone in the Nth subframe.

In the embodiment disclosed herein, the value of x indicates a time between a transmission time point of data and time required to receive and decode the corresponding data and to encode new data. In this instance, the value of x is determined in consideration of the all of delays in the receiving, decoding, and encoding of the data.

For example, in case of the LTE(-A) system, the value of x is defined as 4 ms depending on the processing delay and the TTI.

However, the value of x may be set to various values depending on the physical structure of the system and the performance of the UE and may be expressed as a unit (expressed as an integer) of subframe, a unit (e.g., "ms") of time, etc.

As shown in FIG. 18, the eNB transmits the basic CP zone resource information in the cell to the UE before dynamically configuring the CP zone, in step S1810.

Next, the eNB transmits the CP zone resource information configured in the Nth subframe to the UE through the PDCCH or the PDSCH in the (N−x)th subframe, in step S1820.

In the embodiment disclosed herein, the transmission of the CP zone resource information may be performed through (1) configuration of new radio network (temporary) identifier (e.g., CP-RNTI) and (2) system information.

(1) and (2) related to the transmission of the CP zone resource information are described in detail below with reference to FIGS. 19 to 21.

Next, the UE transmits the UL data to the eNB through the CPRB of the CP zone configured in the Nth subframe with reference to the CP zone resource information, in step S1830.

FIG. 19 is a flow chart showing an example of a method for configuring the dynamic CP zone according to the present disclosure.

Referring to FIG. 19, the eNB transmits a first control message including the basic (or reference) CP zone resource information to the UE, in step S1910.

The first control message is a system information message and may be SIB-2.

The basic CP zone resource information includes the basic CP zone resource region information and the basic CPRB-related information described with reference to FIG. 15.

The detail description of the basic CP zone resource information and the control message transmitting the basic CP zone resource information refers to FIG. 15.

The UE may be a UE having data requiring the low latency

Next, when the allocation of the UL resource needs to be adjusted or changed because of an increase in the UL data traffic (i.e., when the basic CP zone resource, which is previously allocated through the step S1910, needs to be adjusted or changed), the eNB transmits a second control message including the changed CP zone resource information to the UE, in step S1920.

The second control message may be (1) UL Grant transmitted through the PDCCH or (2) system information.

The UL Grant may be expressed by a UL resource allocation message.

When the second control message is the UL Grant, the eNB performs the CRC masking on the second control message with a new RNTI (Radio Network Temporary Identifier) and transmits the second control message to the UE, so that the UE can receive the changed CP zone resource information.

The new RNTI may be defined as CP (Contention-based PUSCH)-RNTI.

Further, when the second control message is the UL Grant, the UL Grant may use (1) UL Grant defined in the existing LTE(-A) system or (2) UL Grant newly defined for CP zone allocation.

When the newly defined UL Grant is used, it may be expressed by UL CP zone Grant.

When the changed CP zone resource information is transmitted using (1) the existing UL Grant, the eNB transmits the UL Grant, on which the CRC masking is performed with a user Identifier (e.g., CP-RNTI) used for the CP zone resource allocation through the existing UL resource allocation method (e.g., UL Grant through DCI format '0' in case of LTE(-A) system), to the PDCCH.

All of the CP zone resource information changed through the existing UL Grant may be transmitted to both a common search space or a UE-specific search space.

Because the changed CP zone resource information may be regarded as broadcast information transmitted to one or more UEs, it may be preferable, but not required, that the changed CP zone resource information is transmitted to the common search space.

Further, when the changed CP zone resource information is transmitted using (2) the newly defined UL Grant, UL Grant including only an information filed required for the UL CP zone allocation may be defined.

In this instance, new DCI format (DCI format 0A) is defined, and the changed CP zone resource information may be transmitted through the newly defined DCI format.

The changed CP zone resource information may include a CP zone resource region field (e.g., a start RB index and/or an end RB index of the CP zone resource), a field of the number of CPRBs (e.g., N or N±i, where T is a value indicating changes in the number of CPRBs), and the like.

All of the CP zone resource information changed through the newly defined UL Grant for the CP zone allocation may be transmitted to both the common search space and the UE-specific search space.

Because the changed CP zone resource information may be regarded as the broadcast information transmitted to one or more UEs, it may be preferable, but not required, that the changed CP zone resource information is transmitted to the common search space.

Next, when the second message is the system information, the eNB performs the CRC masking on the second message with SI-RNTI and transmits the second control message to the UE, so that the UE can receive the changed CP zone resource information.

The system information may be SIB, SIB-2, SIB-X, etc.

As described above, the changed CP zone resource information may include a CP zone resource region field (e.g., a start RB index and/or an end RB index of the CP zone resource), a field of the number of CPRBs (e.g., N or N±i, where 'i' is a value indicating changes in the number of CPRBs), and the like.

When the changed CP zone resource information is transmitted through the system information all of the UEs receive, the UE, which transmits the data without using the CP zone, may receive unnecessary information due to the system information.

Thus, even when the changed CP zone resource information is transmitted through the SIB, a specific SIB-x may be newly defined so that only the UEs requiring the low latency transmission (namely, using the CP zone) can receive the system information.

In step S1920, the eNB transmits the second control message including the changed CP zone resource information of the (N−4)th subframe to the UE, so as to configure the CP zone only in the Nth subframe.

Further, in step S1920, the UE performs blind decoding, so as to receive the second control message, on which the CRC masking is performed with the CP-RNTI or the SI-RNTI.

As described above, when the CRC masking is performed on the second control message with the CP-RNTI, the second control message may be the UL Grant. When the CRC masking is performed on the second control message with the SI-RNTI, the second control message may be the system information.

Next, the UE checks changes in the CP zone resource region (i.e., the basic CP zone resource region) previously allocated in the Nth subframe based on the second control message received through the (N−4)th subframe and transmits the UL data to the eNB through the changed CP zone, in step S1930.

FIG. 20 is a flow chart showing another example of a method for dynamically configuring the CP zone according to the present disclosure.

More specifically, FIG. 20 shows an example where the second control message of FIG. 19 is the UL Grant and the CRC masking is performed on the UL Grant with the CP-RNTI.

Since steps S2010 to S2030 of FIG. 20 correspond to steps S1910 to S1930 of FIG. 19, a detailed description thereof refers to FIG. 19.

FIG. 21 is a flow chart showing another example of a method for dynamically configuring the CP zone according to the present disclosure.

More specifically, FIG. 21 shows an example where the second control message of FIG. 19 is the system information and the CRC masking is performed on the system information with the SI-RNTI.

Since steps S2110 to S2130 of FIG. 21 correspond to steps S1910 to S1930 of FIG. 19, a detailed description thereof refers to FIG. 19.

General Apparatus Able to Apply the Present Disclosure

FIG. 22 is a block diagram of a wireless communication apparatus, to which the methods according to the present disclosure can be applied.

Referring to FIG. 22, a wireless communication system includes an eNB 2210 and a plurality of user equipments 2220 positioned in the eNB 2210.

The eNB 2210 includes a processor 2211, a memory 2212, a radio frequency (RF) unit 2213. The processor 2211 implements the functions, the procedures and/or the methods proposed by the present invention as described in FIGS. 1 to 21. Layers of a wireless interface protocol may be implemented by the processor 2211. The memory 2212 is connected to the processor 2211 and stores various informations for operating the processor 2211. The RF unit 2213 is connected to the processor 2211 and transmits and/or receives an RF signal.

Each user equipment 2220 includes a processor 2221, a memory 2222, and an RF unit 2223. The processor 2221 implements the functions, the procedures and/or the methods proposed by the present invention as described in FIGS. 1 to 21. Layers of a wireless interface protocol may be implemented by the processor 2221. The memory 2222 is connected to the processor 2221 and stores various informations for driving the processor 2221. The RF unit 2223 is connected to the processor 2211 and transmits and/or receives an RF signal.

The memories 2212 and 2222 may be respectively located inside or outside the processors 2211 and 2221 and may be connected to the processors 2211 and 2221 through various well-known means.

The eNB 2210 and/or the user equipment 2220 may include a single antenna or multiple antennas.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention can be implemented using various means, for example, hardware, firmware, software or a combination thereof, etc.

In case of the implementation by hardware, the embodiment of the present invention may be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor, and the like.

In case of the implementation by firmware or software, the embodiment of the present invention may be implemented by modules, procedures, and/or functions for performing the above-described functions or operations. Software code may be stored in a memory and may be driven by a processor. The memory may be positioned inside or outside the processor and may exchange data with the processor through the various well-known means.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The embodiment of the invention described the method applied to 3GPP LTE/LTE-A system as an example of the method for requesting scheduling for the uplink data transmission in the wireless communication system. However, the embodiment of the invention may be applied to various wireless communication systems as well as 3GPP LTE/LTE-A system.

The invention claimed is:

1. A method for transmitting uplink (UL) data requiring low latency in a wireless communication system, the method performed by a user equipment (UE) comprising:

receiving a first control message for informing a basic Contention-based PUSCH (Physical Uplink Shared Channel) Zone (CP zone) allocated to each subframe from an enhanced Node B (eNB), the first control message comprising basic CP zone resource information indicating resource information of the basic CP zone;

receiving a second control message for informing changes in a CP zone allocated to a specific subframe from the eNB, the second control message comprising changed CP zone resource information indicating resource information of the changed CP zone; and transmitting UL data to the eNB through a CPRB (Contention PUSCH Resource Block) of the changed CP zone based on the received second control message.

2. The method of claim 1, wherein the basic CP zone resource information comprises at least one of basic CP zone resource region information indicating a resource region of the basic CP zone, CPRB size information indicating resource size of one CPRB, CPRB count information indicating the total number of CPRBs included in the basic CP zone, or information of the UL data transmitted through the CPRB.

3. The method of claim 2, wherein the basic CP zone resource region information comprises at least one of start resource information of the basic CP zone or last resource information of the basic CP zone.

4. The method of claim 3, wherein the start resource information and the last resource information of the basic CP zone are set to a Resource Block (RB) index or an offset value.

5. The method of claim 1, wherein the second control message is received through a (N−x)th subframe, and
wherein the UL data is transmitted through a Nth subframe.

6. The method of claim 1, wherein the second control message is UL Grant or a system information message.

7. The method of claim 6, wherein when the second control message is the UL Grant, CRC (Cyclical Redundancy Check) masking is performed on the second control message with an RNTI (Radio Network Temporary Identifier) newly defined for the CP zone resource allocation.

8. The method of claim 7, wherein the newly defined RNTI is a CP-RNTI (Contention based PUSCH-Radio Network Temporary Identifier).

9. The method of claim 8, wherein the second control message is transmitted through a PDCCH (Physical Downlink Control Channel),
wherein the receiving of the second control message comprises blind decoding the C-RNTI and the CP-RNTI in a search space of the PDCCH.

10. The method of claim 6, wherein when the second control message is the system information message, CRC masking is performed on the second control message with an SI-RNTI (System Information-Radio Network Temporary Identifier).

11. The method of claim 1, wherein the UE has data requiring the low latency.

12. A user equipment (UE) for transmitting uplink (UL) data requiring low latency in a wireless communication system comprising:
a radio frequency (RF) unit to transceiver an RF signal; and
a processor configured to receive a first control message for informing a basic Contention-based PUSCH (Physical Uplink Shared Channel) Zone (CP zone) allocated to each subframe from an enhanced Node B (eNB), to receive a second control message for informing changes in a CP zone allocated to a specific subframe from the eNB, and to transmit UL data to the eNB through a CPRB (Contention PUSCH Resource Block) of the changed CP zone based on the received second control message,
wherein the first control message includes basic CP zone resource information indicating resource information of the basic CP zone, and the second control message includes changed CP zone resource information indicating resource information of the changed CP zone.

* * * * *